United States Patent [19]
Mankovitz et al.

[11] Patent Number: 5,543,929
[45] Date of Patent: Aug. 6, 1996

[54] TELEVISION FOR CONTROLLING A VIDEO CASSETTE RECORDER TO ACCESS PROGRAMS ON A VIDEO CASSETTE TAPE

[75] Inventors: Roy J. Mankovitz, Encino, Calif.; Yee K. Ng, Hong Kong, Hong Kong; Daniel S. Kwoh, La Canada, Calif.

[73] Assignee: E. Guide, Inc., Beverly Hills, Calif.

[21] Appl. No.: 140,211

[22] Filed: Oct. 20, 1993

[51] Int. Cl.⁶ .............................. H04N 5/76; H04N 7/00; H04N 11/00
[52] U.S. Cl. .................. 358/335; 360/72.1; 360/72.2; 348/464
[58] Field of Search ................... 358/335, 310, 358/342; 360/33.1, 69, 72.1, 72.2, 72.3; 348/461, 464, 465, 467, 468; H04N 5/92, 5/76, 7/00, 11/00, 9/79

[56] References Cited

U.S. PATENT DOCUMENTS

| | | | |
|---|---|---|---|
| 4,224,644 | 9/1980 | Lewis et al. | 360/72.2 |
| 4,321,635 | 3/1982 | Tsuyuguchi | 360/72.2 |
| 4,426,684 | 1/1984 | Sechet et al. | 364/900 |
| 4,555,803 | 11/1985 | Hirose | 382/61 |
| 4,591,931 | 5/1986 | Baumeister | 360/72.1 |
| 4,641,203 | 2/1987 | Miller | 358/335 |
| 4,641,205 | 2/1987 | Beyers, Jr. | 360/33.1 |
| 4,649,442 | 3/1987 | Kunii et al. | 360/72.2 |
| 4,706,121 | 11/1987 | Young | 358/142 |
| 4,866,434 | 9/1989 | Keenan | 340/825.72 |
| 4,870,515 | 9/1989 | Stokes | 360/72.2 |
| 4,873,584 | 10/1989 | Hashimoto | 358/335 |
| 4,908,713 | 3/1990 | Levine | 358/335 |
| 4,935,823 | 6/1990 | Pelloni et al. | 360/13 |
| 4,945,412 | 7/1990 | Kramer | 348/461 |
| 4,953,035 | 8/1990 | Yoshio | 358/335 |
| 4,989,104 | 1/1991 | Schülein et al. | 360/72.1 |
| 5,001,688 | 3/1991 | Louvenberg et al. | 369/32 |
| 5,012,334 | 4/1991 | Etra | 358/102 |
| 5,047,867 | 9/1991 | Strubbe et al. | 358/335 |
| 5,105,401 | 4/1992 | Aoyagi et al. | 369/32 |
| 5,109,482 | 4/1992 | Bohrman | 395/154 |
| 5,122,886 | 6/1992 | Tanaka | 358/335 |
| 5,126,987 | 6/1992 | Shiba et al. | 369/32 |
| 5,148,403 | 9/1992 | Gardner | 360/15 |
| 5,164,865 | 11/1992 | Shaw | 360/72.2 |
| 5,172,363 | 12/1992 | Greenspun | 369/85 |
| 5,187,589 | 2/1993 | Kono et al. | 358/335 |
| 5,210,734 | 5/1993 | Sakurai | 369/49 |
| 5,237,412 | 8/1993 | Nakojima | 348/461 |
| 5,343,300 | 8/1994 | Hennig | 358/335 |
| 5,425,100 | 6/1995 | Thomas et al. | 348/467 |

FOREIGN PATENT DOCUMENTS 393955A  10/1990  European Pat. Off. ............ 27/34

Primary Examiner—Thai Q. Tran
Attorney, Agent, or Firm—Christie, Parker & Hale, LLP

[57] ABSTRACT

A television for controlling a video cassette recorder to access programs on a video cassette tape, the television comprising a circuit for retrieving a directory of programs from a television signal received from the video cassette recorder, a circuit for retrieving a program identifier from the television signal received from the video cassette recorder, a circuit means for displaying the directory of programs to allow a user to select a program from the directory, a circuit for determining from the retrieved program identifier and the selected program the amount to either advance or rewind the video cassette tape to position the video cassette tape in the video cassette recorder at the beginning of the selected program, and a circuit for commanding the video cassette recorder to position the video cassette tape at the beginning of the selected program.

19 Claims, 23 Drawing Sheets

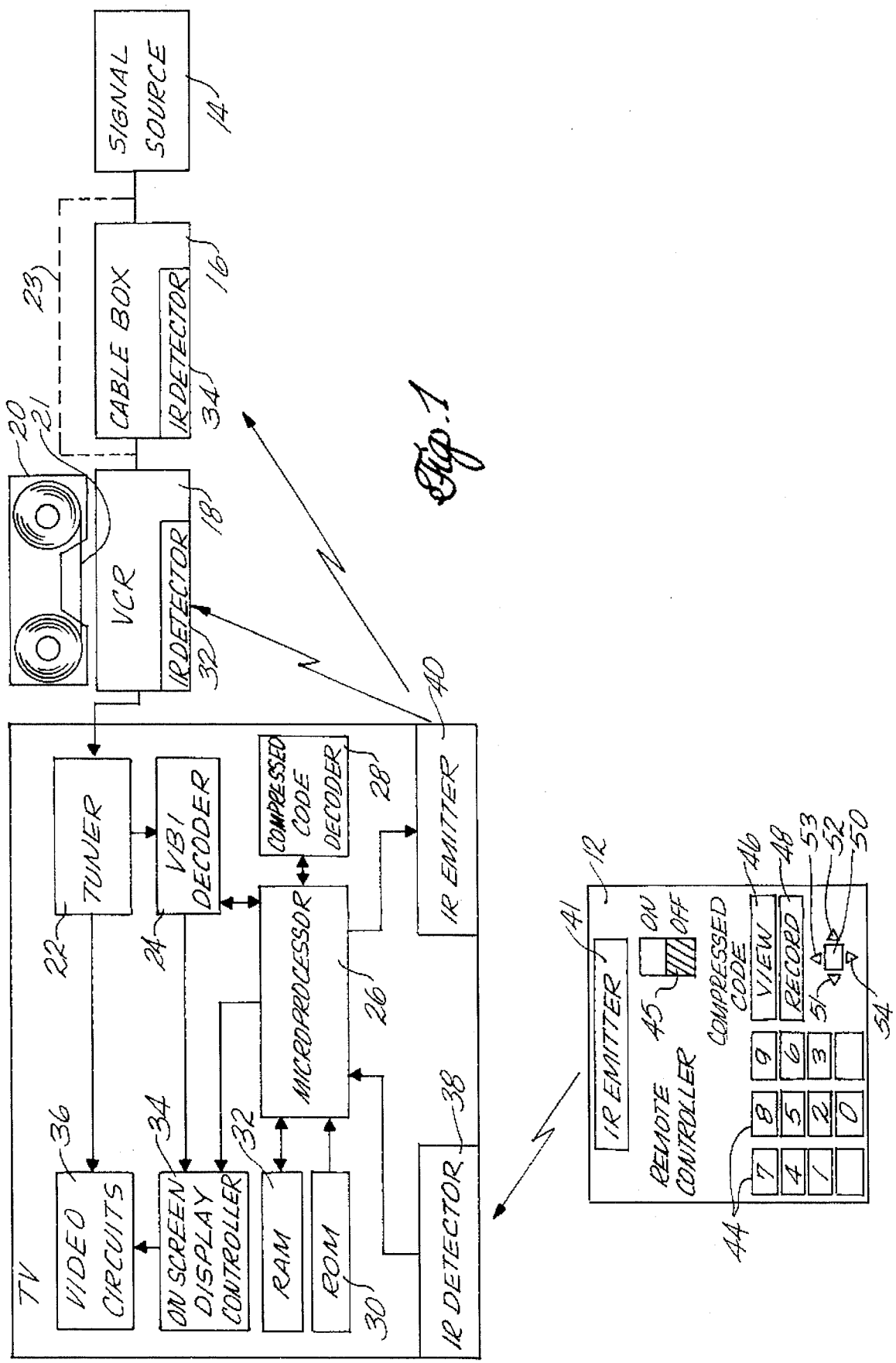

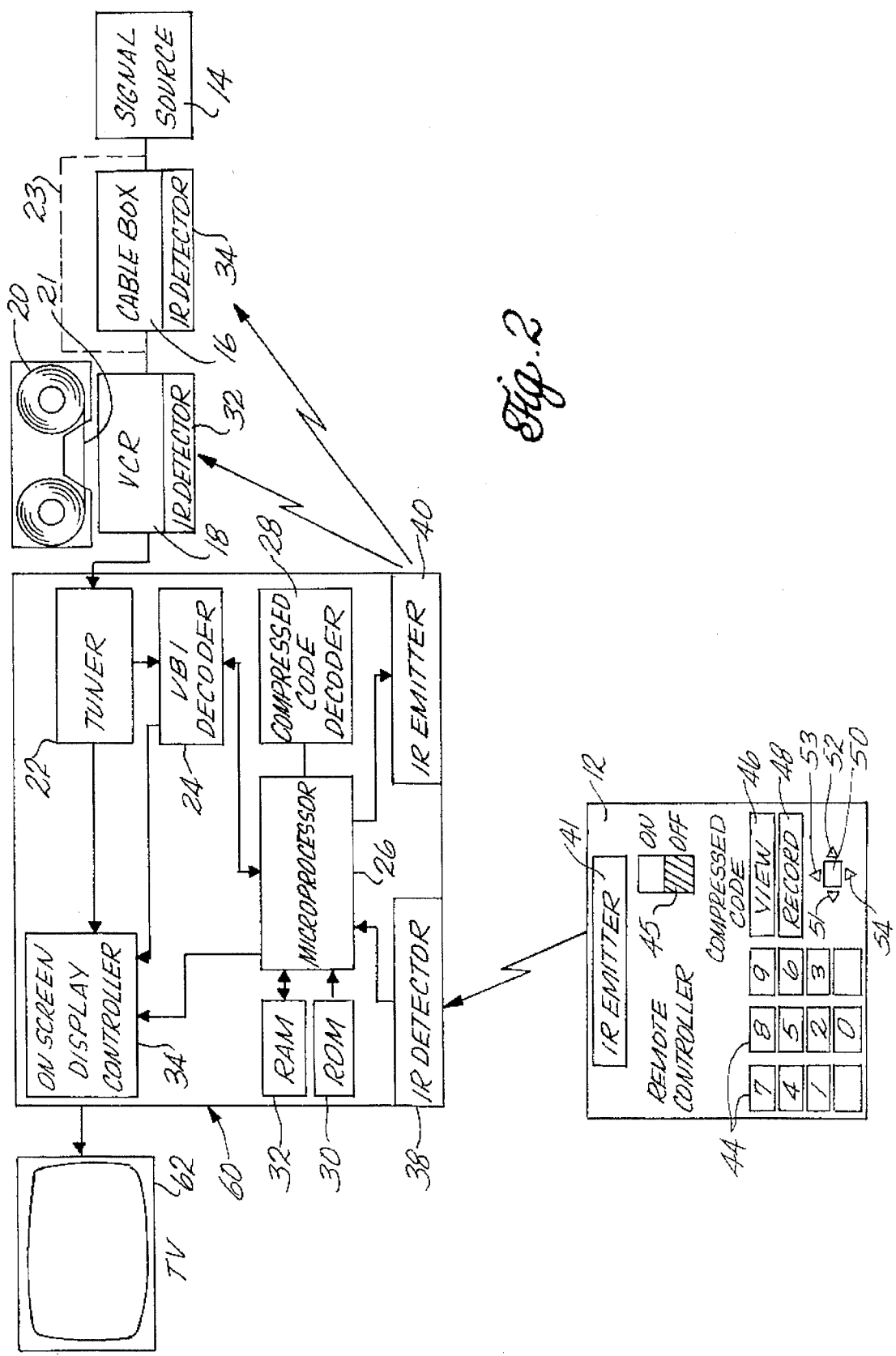

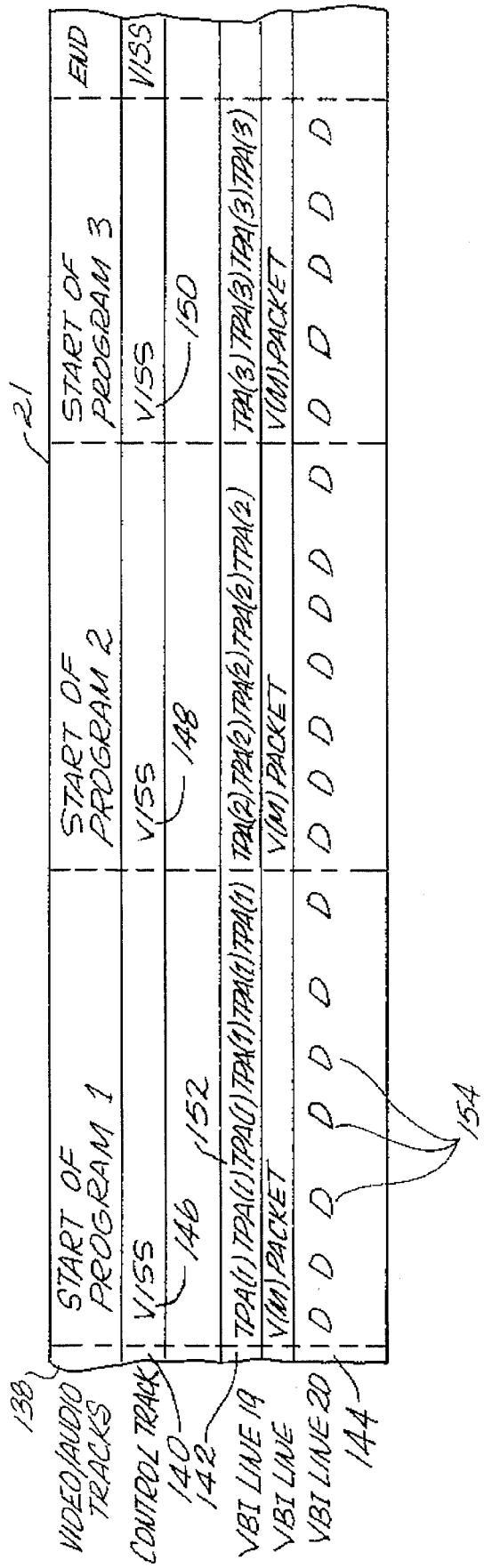

*Fig. 6B*

LIBRARY FORMAT 166

TAPE NO. 1
- TARZAN
- TERMINATOR

TAPE NO. 2
- <u>CAR GUIDE</u>
  - MERCEDES VIDEO CLIP
  - LEXUS VIDEO CLIP
- <u>SPORTS GUIDE</u>
  - NFL MONDAY NITE FOOTBALL CLIP
  - NHL PREVIEWS

TAPE NO. 3
- <u>RESTAURANT GUIDE</u>
  - ALICES RESTAURANT
  - MADEO'S
  - 22ND ST. LANDING
  - ⋮

TAPE NO. 4
- ⋮

D(N) FORMAT ON VBI LINE 20

| ADDITIONAL FIELDS | PROGRAM NUMBER(N) | START ADDRESS | END ADDRESS | RECORD SPEED | COMPRESSED CODE | CHANNEL, DATE TIME-OF-DAY,LENGTH | PROGRAM IDENTIFIER | TITLE |
|---|---|---|---|---|---|---|---|---|
| 172 | 174 | 176 | 178 | 180 | 182 | 184 | 186 |

170

TPA PACKET FORMAT ON VBI LINE 19

| TAPE IDENTIFICATION (TID) | PROGRAM NUMBER (N) | ABSOLUTE ADDRESS (AA) |
|---|---|---|
| 188 | 190 | 192 |

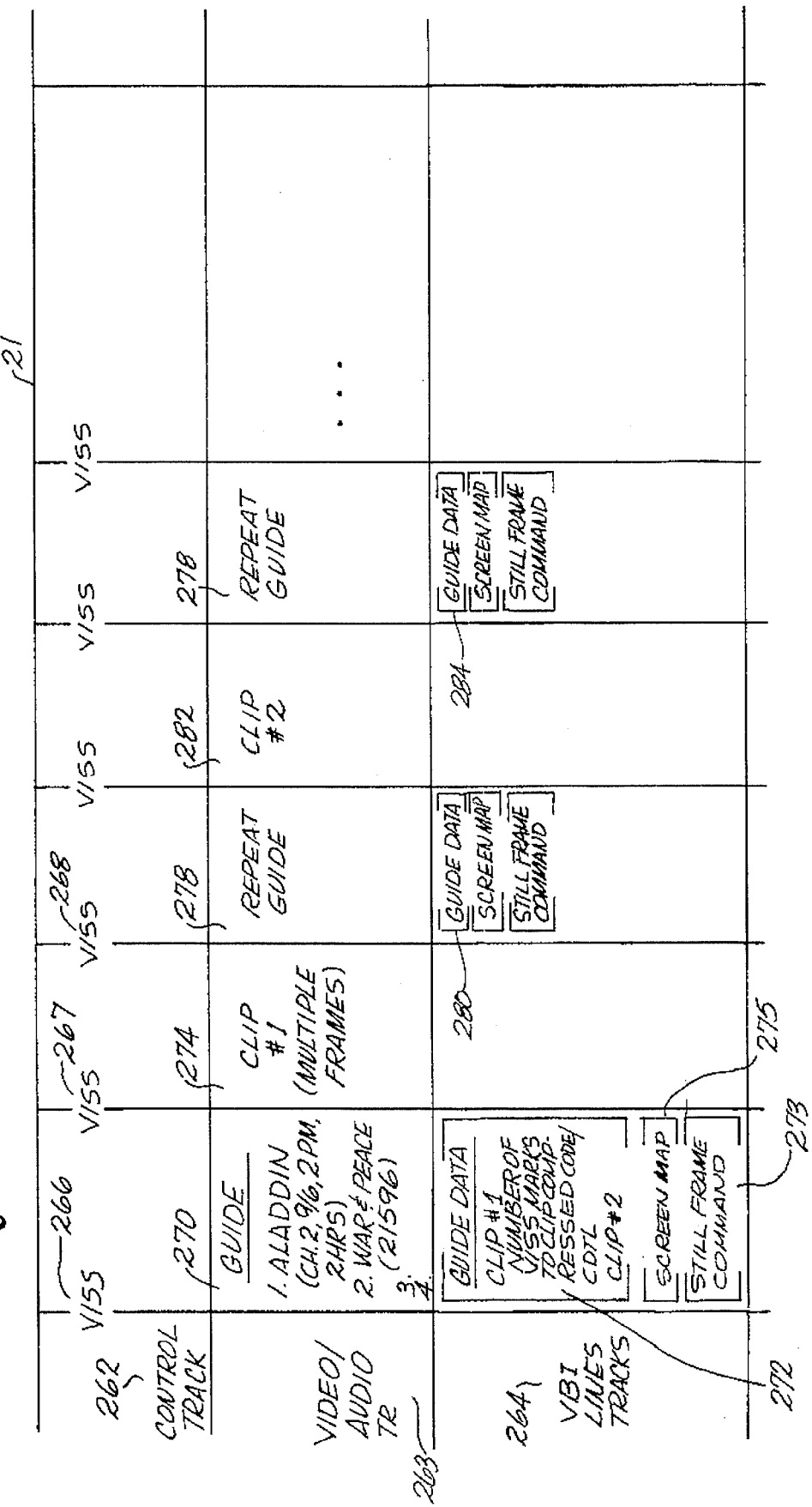

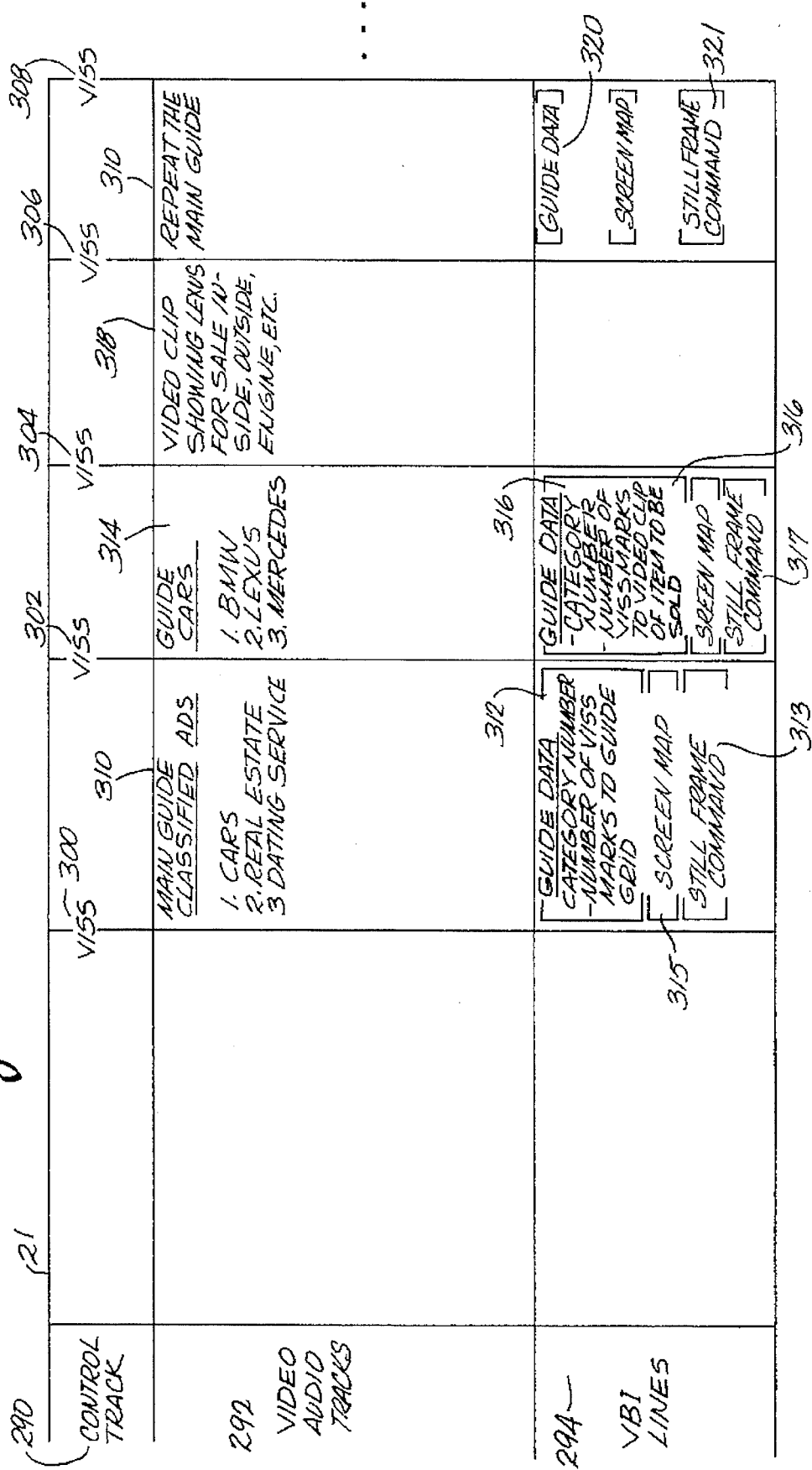

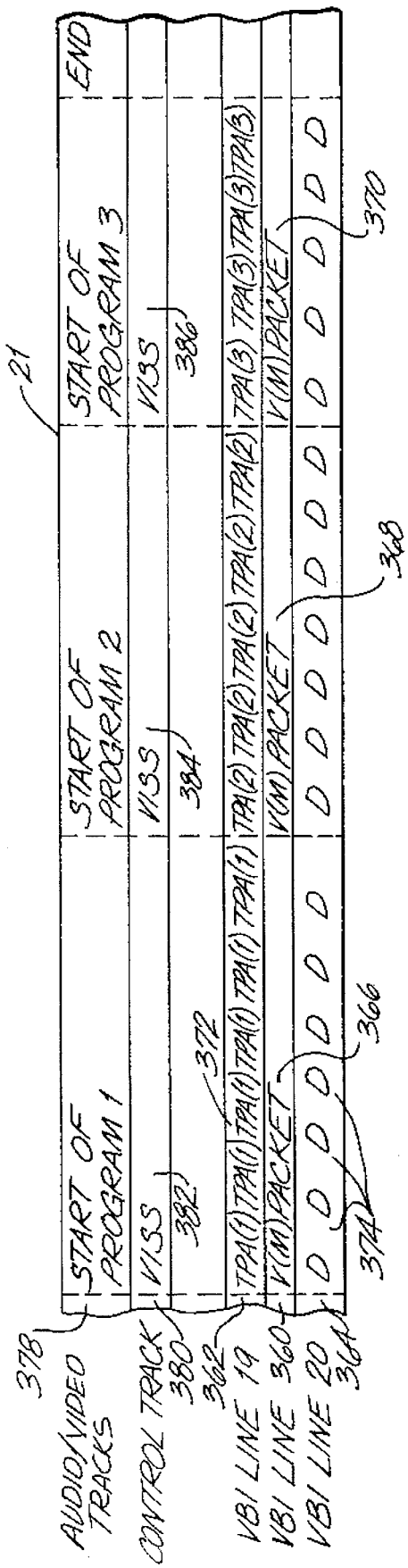

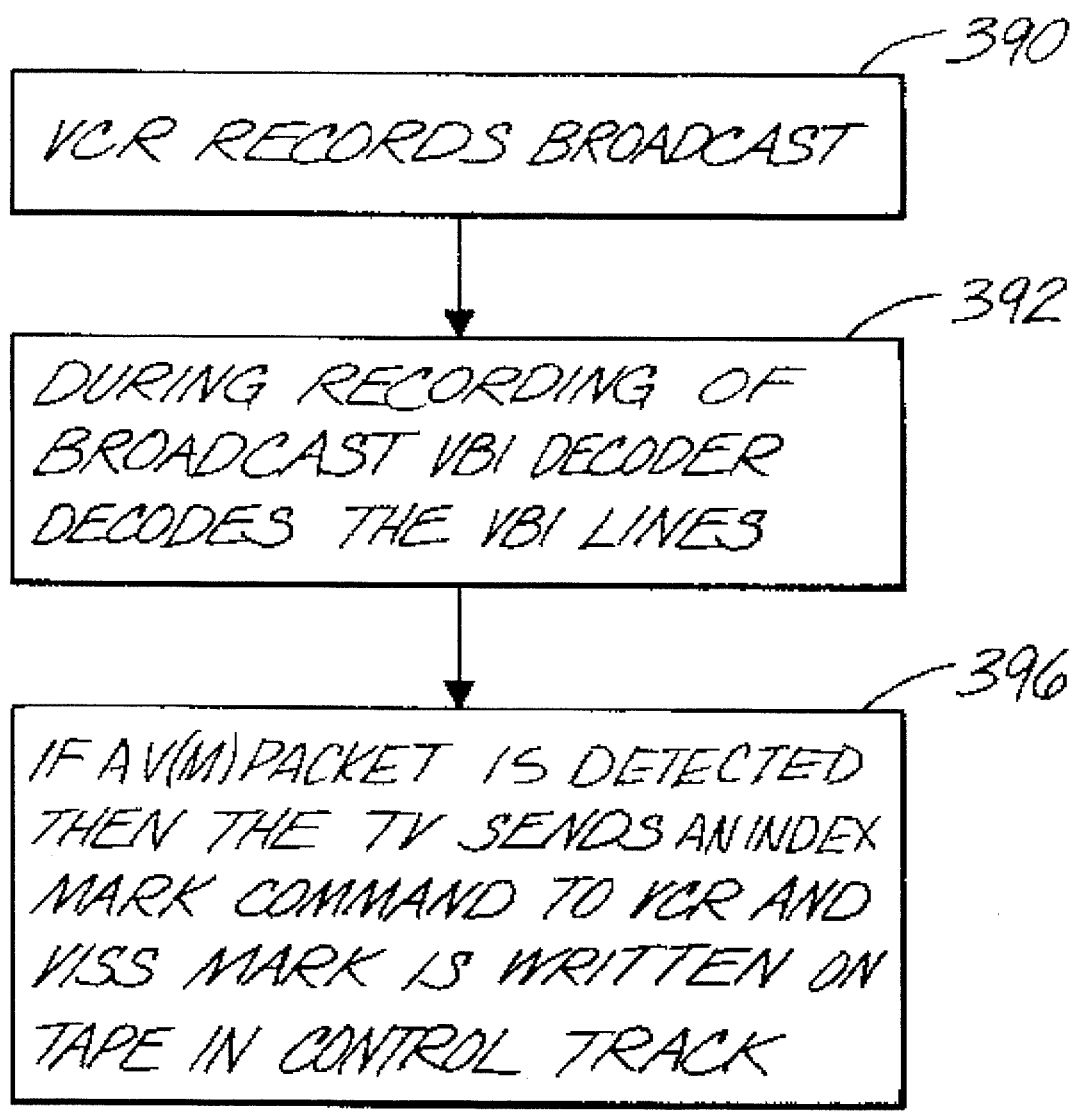

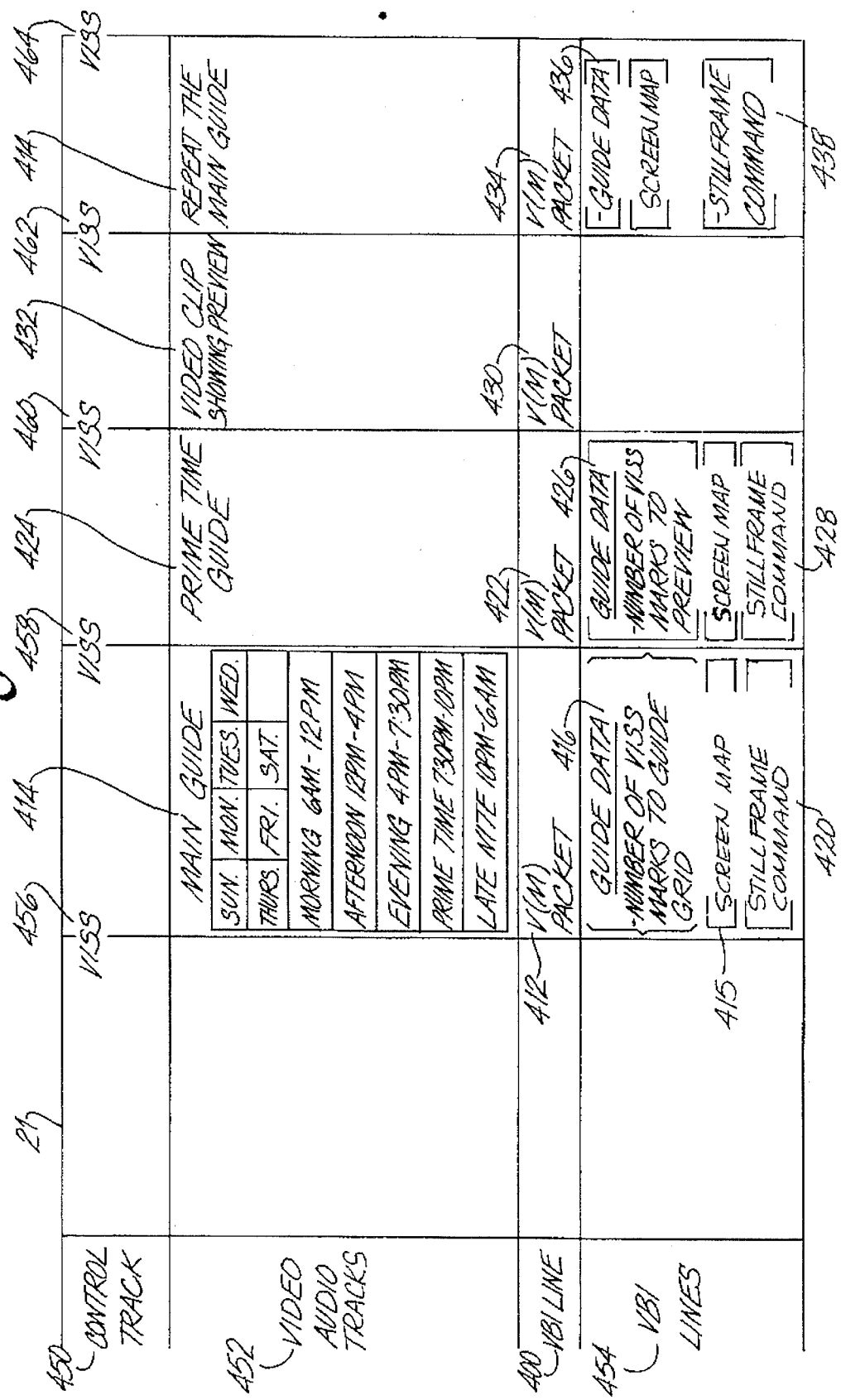

5,543,929

TELEVISION FOR CONTROLLING A VIDEO CASSETTE RECORDER TO ACCESS PROGRAMS ON A VIDEO CASSETTE TAPE

BACKGROUND OF THE INVENTION

This invention relates generally to televisions and particularly to apparatus and methods for controlling video cassette recorders from a television and also relates to electronic guides and electronic magazines.

Previews of upcoming movies or television programs are commonly shown to generate interest in them. One technique is to show clips of the video before or after the full presentation of another program. This is done both for television programs or movies to be shown on television. Increasingly common is the inclusion of video clips of other movies on a rented video cassette tape. The renter of the video cassette tape rents the tape to watch a particular movie, but also can watch the previews, which are put onto the otherwise unused tape in the video cassette. A problem with this conventional technique is Also increasingly common is the video cassette tape with infomercials. Usually, only one infomercial is put on a tape, for example a Plymouth Voyager advertisement, and the tape is mailed out to potential buyers. If more infomercials or advertisements are on the tape then the user must watch the entire tape to see all the advertisements. Even if a table of contents is provided at the beginning of the tape, there is no easy method of advancing the tape to the location of the selected advertisement.

It is desirable to have a common point of control for accessing programs on a video tape cassette and a television is able to provide this capability.

Accordingly, there is a need in the art for a television for controlling a video cassette recorder to access programs on a video cassette tape. There is also a need for a television for providing control for indexing a tape to a selected program or video.

SUMMARY OF THE INVENTION

According to the invention apparatus and methods are provided for controlling a video cassette recorder from a television to access programs on a video cassette tape. The method includes the steps of broadcasting a television signal having a plurality of first and second lengths of time, the first length of time having a first index mark at the beginning of the first length of time and a second index mark in the vertical blanking interval at the end of the first length of time, and the television signal having between the first and second index marks, a guide to broadcast programs, guide data associated with the guide, the guide data including for each program contained in the guide a number of index marks either forward or backward in the television signal from the guide data to the program, and a still frame command before the second index mark, the second length of time being after the first length of time and comprising a program, recording the broadcasted television signal on a video cassette tape with a video cassette recorder as the broadcasted television signal is received, detecting any index marks in the television signal broadcast and for each index mark detected in the broadcast sending a index mark command to the video cassette recorder to write an index indication on the video cassette tape as the broadcasted television signal is recorded on the video cassette tape, playing the video cassette tape, and using the guide and guide data to access programs on the tape.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 1 is a schematic showing a television for controlling a video cassette recorder (VCR) to provide access to programs and video clips according to the present invention.

FIG. 2 is a schematic showing a controller between a television and a VCR for controlling a video cassette recorder (VCR) to provide access to programs and video clips according to the present invention.

FIG. 5 is a drawing showing a tape layout for providing access to programs and video clips according to the present invention.

FIG. 6B is a drawing showing the format of a library of multiple directories according to the present invention.

FIG. 11A is a drawing showing another tape layout for providing access to programs and video clips according to the present invention.

FIG. 11B is a drawing showing a tape layout having a hierarchy of guides and embedded guide data for providing access to video clips or infomercials according to the present invention.

FIG. 13B is a drawing showing the tape format after recording of the broadcast on a VCR according to the present invention.

FIG. 14 is a flow graph of the steps for creating a tape during recording of a broadcast of programs and video clips according to the present invention.

FIG. 15B is a drawing showing the tape format after recording of the broadcast of programs, video clips, and/or a video directory on a VCR according to the present invention.

DETAILED DESCRIPTION OF THE SPECIFIC EMBODIMENTS

Figure 3A:
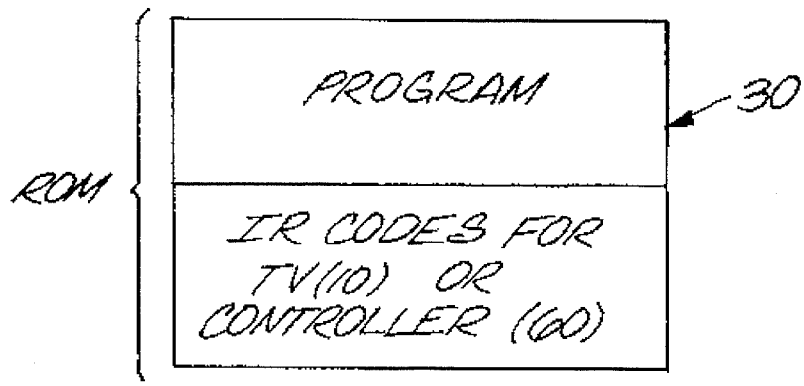
FIGS. 3A and 3B are schematics showing the partial contents of a random-access memory (RAM) and read-only memory (ROM) according to the present invention.

Referring to the drawings, FIG. 1 shows a television 10 for controlling a video cassette recorder 18 to access programs on a video tape cassette 20, which contains tape 21. The video cassette recorder 18 can be used to play video tape cassettes 20, and can also be used to record programs from signal source 14 sent directly via line 23 to VCR 18 or through cable box 16. As shown in FIG. 1, the VCR 18 has an output to tuner 22, which is coupled to video circuits 36. Also receiving the output of tuner 22 is a vertical blanking interval line decoder 24. Vertical blanking interval lines are described below in connection with the discussion of FIG. 10, and information can be contained in the vertical blanking interval lines and decoded. A microprocessor 26 receives decoded VBI information from VBI decoder 24 and processes this information to control VCR 18 to access programs from the video tape cassette 20. Random-access memory 32 and read-only memory are coupled to the microprocessor. An on-screen display controller 34 has an interface to the microprocessor 26 and also an interface to the VBI decoder 24. An infrared detector 38 has an interface to the microprocessor 26 and receives commands from remote controller 12. An infrared emitter 40 in the television 10 interfaces to microprocessor 26 and can send commands to the VCR 18 via infrared detector 32 and to the cable box 16 via the infrared detector 34. A compressed code decoder 28 in the television 10 has an interface to microprocessor 26.

In general the television 10 for controlling the video cassette recorder to access programs on the video cassette tape 20 operates by decoding information in the vertical blanking interval line. In VBI decoder 24, processing that information in microprocessor 26, and commanding the VCR 18 via infrared emitter 40 and infrared detector 32 in order to access selected programs for viewing. The television 10 is also able to interact with the video cassette recorder while it is recording a program from signal source 14. The television 10 can also control the recording of programs to be broadcast at a later time on the VCR 18.

The remote controller 12, shown in FIG. 1 has a number of keys, which include numerical keys 44 and compressed code switch 45. The remote controller 12 also includes a view key 46 and a record key 48. The remote controller may further advantageously include a cursor control having up/down keys 53 and 54, respectively, right/left keys 51 and 52, respectively, and an activate key 50. There are means in the remote controller 12 that interpret each key as it is pressed, and send the proper command signal 16 to the television 10 via the infrared emitter 41. Except for the unique keys including view key 46, record key 48, and compressed code switch 45, the remote controller is essentially the same as any other remote controller in function. It is to be noted that the typical keys of remote controllers, such as volume control and channel selection, are not shown on the controller of FIG. 1, but would ordinarily be present.

In FIG. 2 is shown another embodiment of the invention in which there is a separate controller 60 for controlling the VCR 18 to access programs on video tape cassette 20. A conventional television 62 can be used with controller 60 which is placed between television 62 and the video cassette recorder 18. The controller 60 has a tuner 22 coupled to a VBI decoder 24 and a microprocessor 26 which has interfaces to random-access memory 32 and read-only memory 30. The tuner 22 interfaces to on-screen display controller 34 which also interfaces to VBI decoder 24 and microprocessor 26. The controller operates similarly to the circuitry described for television 10 in that the infrared detector 38 receives commands from remote controller 12 and the commands are processed by microprocessor 26. The controller 60 also can control the operation of VCR 18 and cable box 16 via infrared emitter 40. The operation of remote controller 12 in FIG. 2 is essentially the same as the remote controller 12 in FIG. 1.

Figure 4A:
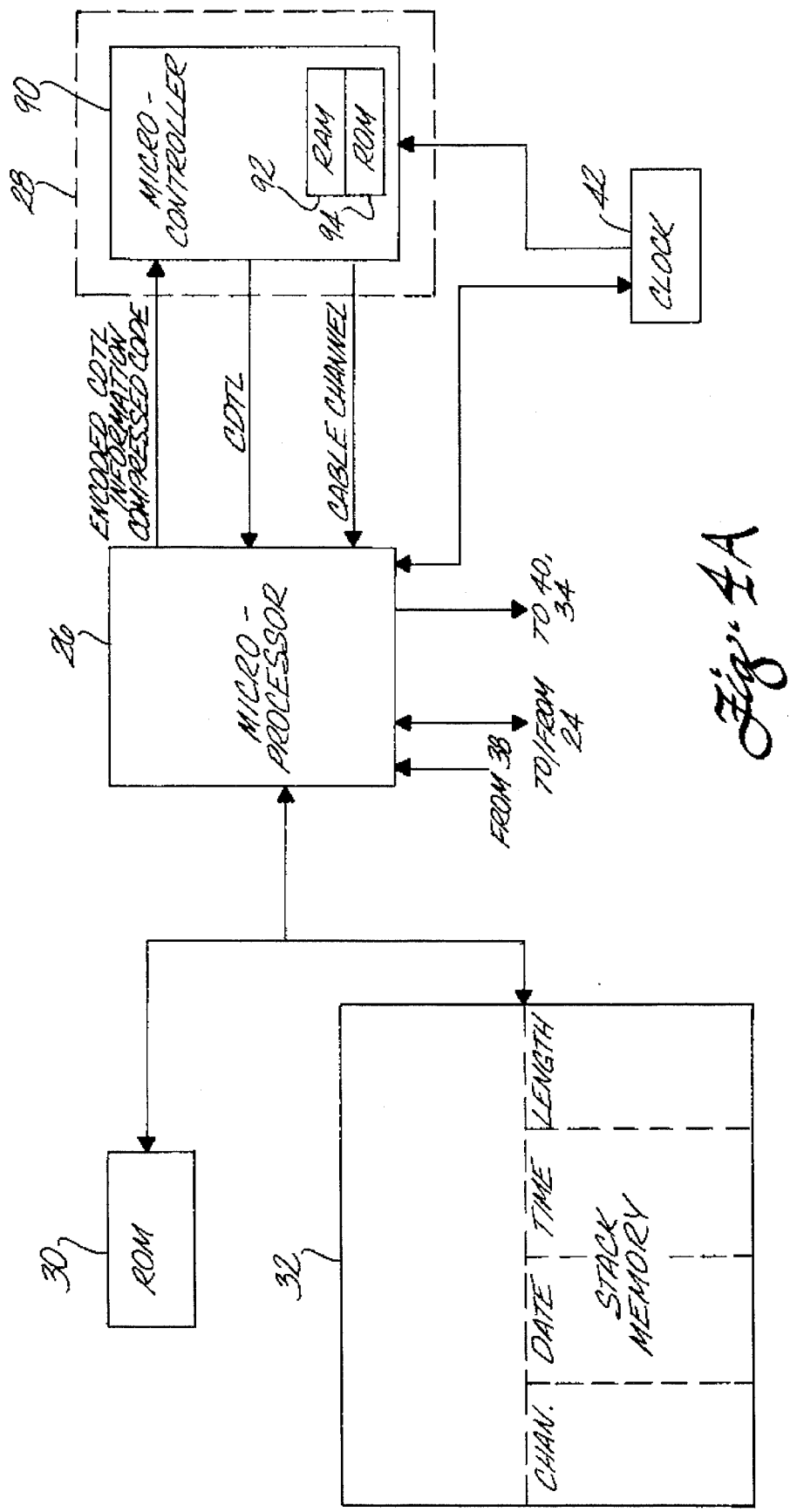
FIG. 4A is a schematic of a compressed code decoder coupled to a microprocessor according to the present invention.

The microprocessor 26, shown in FIGS. 1, 2 and 4A performs the overall control functions, and has attached a read-only memory 30 and a random-access memory (RAM) 32. Interfaces to the microprocessor 26 include an input from infrared detector 38 and outputs to infrared emitter 40 and on screen display controller 34. The microprocessor also interfaces to and from vertical blanking interval decoder 24, to and from clock 42, and to and from compressed code decoder 28.

Figure 3B:
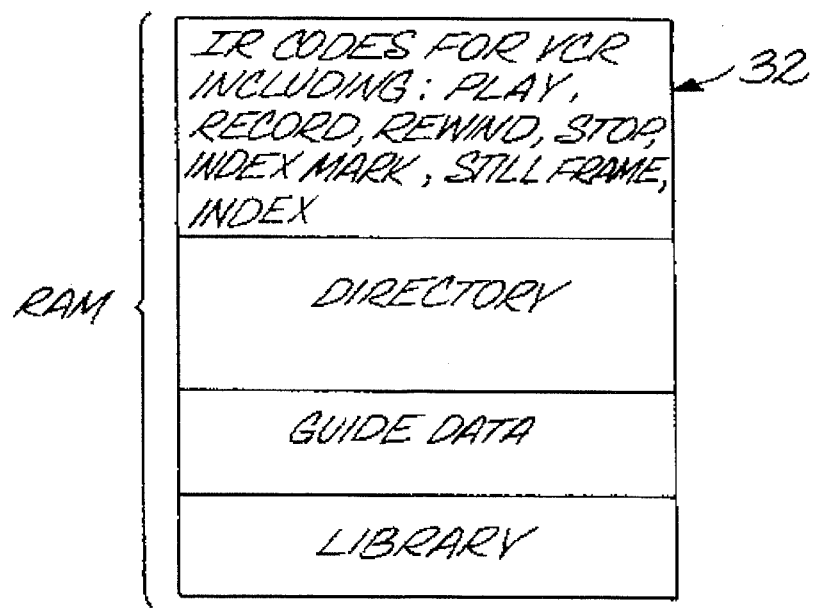

As shown in FIG. 3A, the read-only memory 30 includes a section for a set of instructions for the program that controls the operation of the microprocessor 26 and a section for infrared codes for controlling the television 10 or the controller 60. As shown in FIG. 3B, the random-access memory 32 includes a section for the infrared codes for controlling the VCR including codes for the following commands: play, record, rewind, stop, index mark, still frame, and index to an index mark. Also included are sections for a directory, guide data, and a library, whose functions are described below.

Figure 3C:
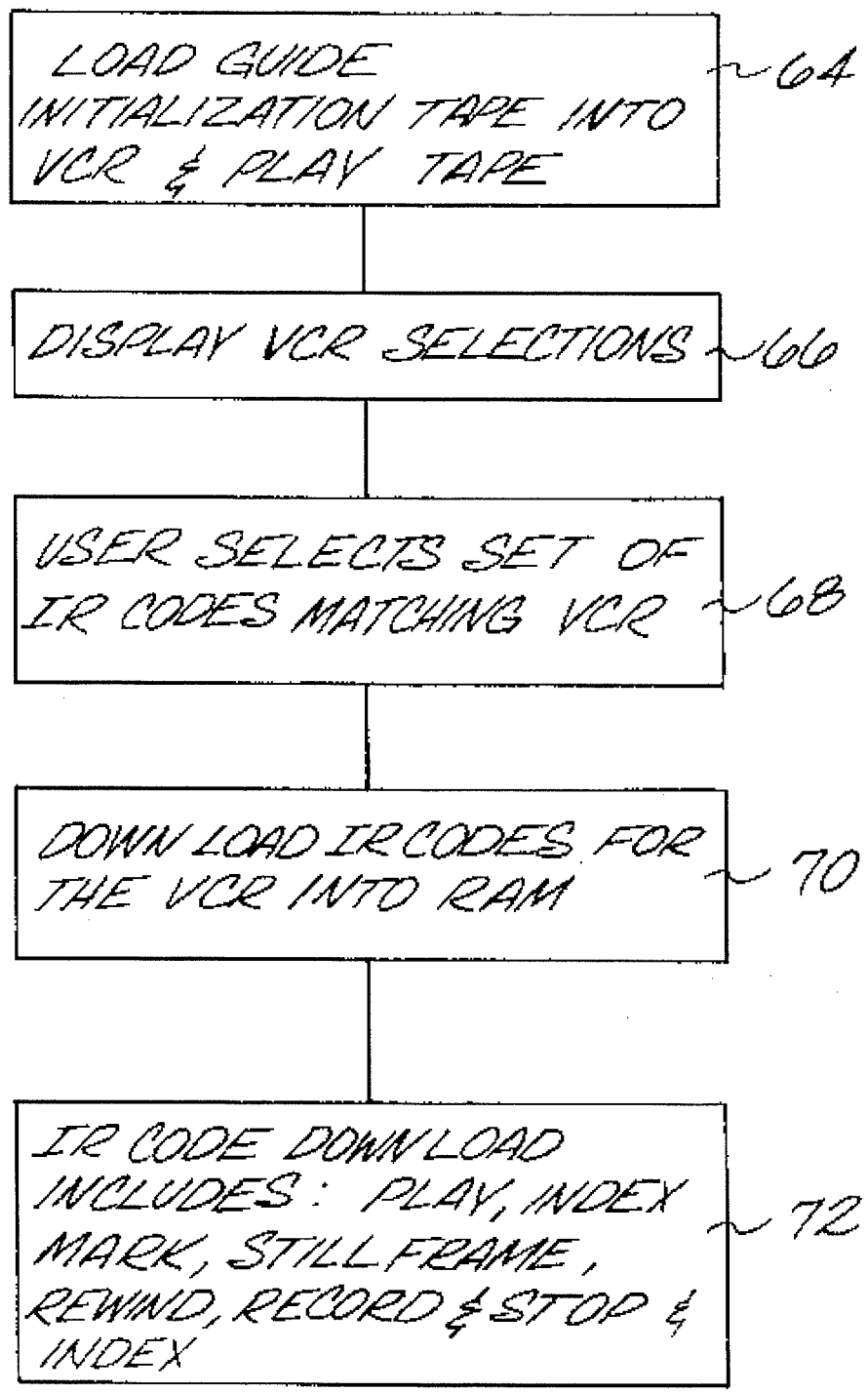
FIG. 3C is a flow graph of steps for loading infrared codes for the VCR into RAM according to the present invention.

FIG. 3C is a flow graph of steps for initializing the television according to the present invention. A special initialization tape is loaded into the video cassette recorder 18 in step 64 and the initialization tape is played. The initialization tape has encoded in its video blanking interval lines the infrared code libraries for substantially all types of VCRs. When the tape is played, video cues are displayed on the television 10 to enable the user to locate the codes for the particular type of VCR in use. Then in step 70 the infrared codes for the user's VCR are downloaded into random-access memory 32 via tuner 22, VBI decoder 24, and microprocessor 26. Once the infrared codes have been loaded into the random-access memory 32 of the television 10 can control the VCR to provide access to programs and video clips.

When a compressed codes are used, the random-access memory 32, as shown in FIG. 4A, includes a section of stack memory for storing channel, date, time-of-day, and length (CDTL) for programs selected to be recorded. The compressed codes are encoded CDTL information and may be advantageously used to simplify the preprogramming of VCRs.

One implementation of the compressed code decoder 28 is shown in FIG. 4A. A microcontroller 90 with a random-access memory 92 and a read-only memory 94 has interfaces to microprocessor 26. A compressed code, which represents encoded CDTL, is sent to microcontroller 90, which decodes the compressed code and returns CDTL information to microprocessor 26. If the microprocessor 26 determines that a compressed code has been received, then the compressed code will be sent to the compressed code decoder 28 for decoding. The compressed code decoder 28 converts the compressed code into channel, date, time and length (CDTL) information which is stored in RAM 32 and used by the microprocessor 26 to control the recording of programs on a VCR.

Figure 4B:
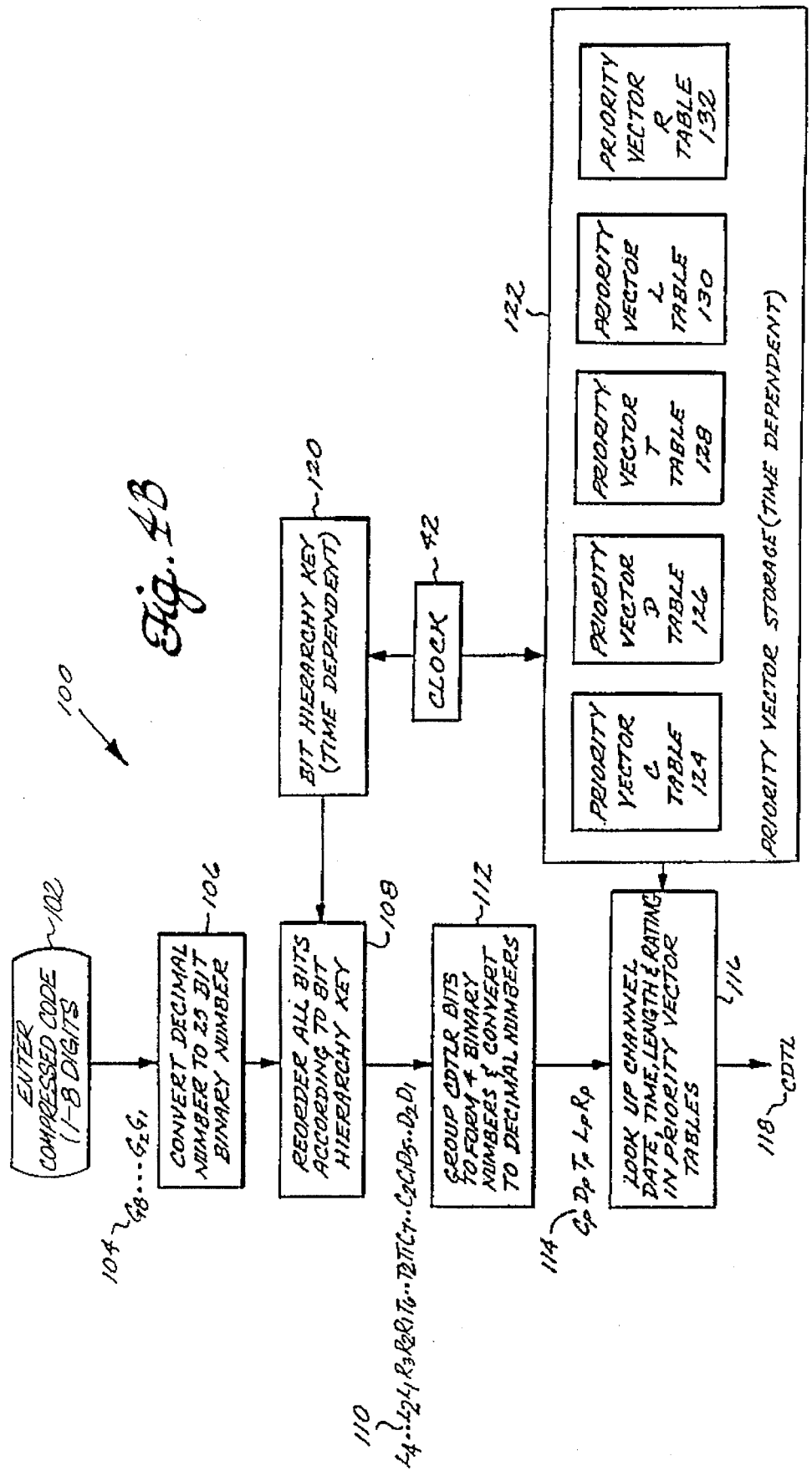
FIG. 4B is a flow graph of the steps for decoding a compressed code, which is encoded channel, date, time-of-day, and length (CDTL) information, into CDTL according to the present invention.

The method of decoding of the compressed code into CDTL is set forth in the flow chart of FIG. 4B. As shown in FIG. 4B, the compressed code decoding can be a function of the output of clock 42. The compressed code encoding and decoding are described in continuation-in-part application Ser. No. 07/829,412, filed Feb. 3, 1992, which is incorporated herein by this reference as though set forth in full.

The clock 42 is also used for timing the operations of the microprocessor 26. When a date and time-of-day is read from clock 42 that matches the date and time in stack memory in random-access memory 32, then the microprocessor 26 controls the VCR to record the program. Instead, if the VCR has preprogramming storage, then the CDTL information can be sent directly to the VCR and a clock in the VCR will be used to control the timing of recording. If the VCR also has the ability to decode the compressed codes, then the compressed codes can be sent directly to the VCR and the VCR will decode the compressed codes into CDTL for the programming the VCR.

FIG. 5 illustrates one layout of information on a tape 21 for playback in VCR 18 under control by television 10 or controller 60. The tape layout has video and audio tracks 138 for the programs, Video Index Search System (VISS) marks on a control track 140, TPA packets each containing a tape identification number, program number, and absolute address stored on a vertical blanking interval line 19, and a directory stored in the vertical blanking interval line 20 in accordance with the principles of the invention.

Figure 10:
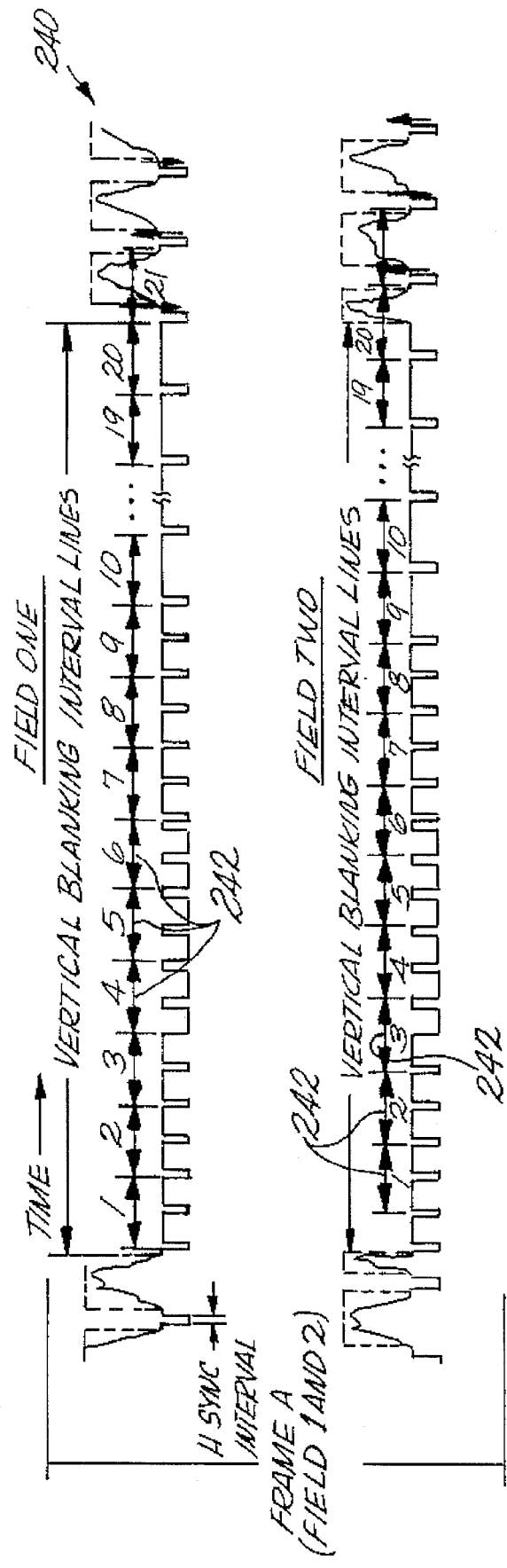
FIG. 10 is a drawing showing VBI lines according to the present invention.

FIG. 10 is a diagram illustrating a vertical blanking interval of an interlaced television scanning raster. The first field of the television signal starts at the upper left corner of the screen and writes lines to the bottom of the screen. At the bottom of the screen the beam writing the screen retraces in a series of lines back to the top of the screen. These lines are designated as the vertical blanking interval lines 242 in FIG. 10. During the retrace the writing to the screen is blanked; however, because the signal is still present, additional information can be sent during the vertical blanking interval. There are at least 20 lines in the vertical blanking interval. After the vertical blanking interval, the second field is written on the screen and there is another vertical blanking interval, as shown in FIG. 10.

In FIG. 5, VISS marks 146, 148 and 150 are placed in the control track 140 at the start of the each program on the tape.

Figure 6A:
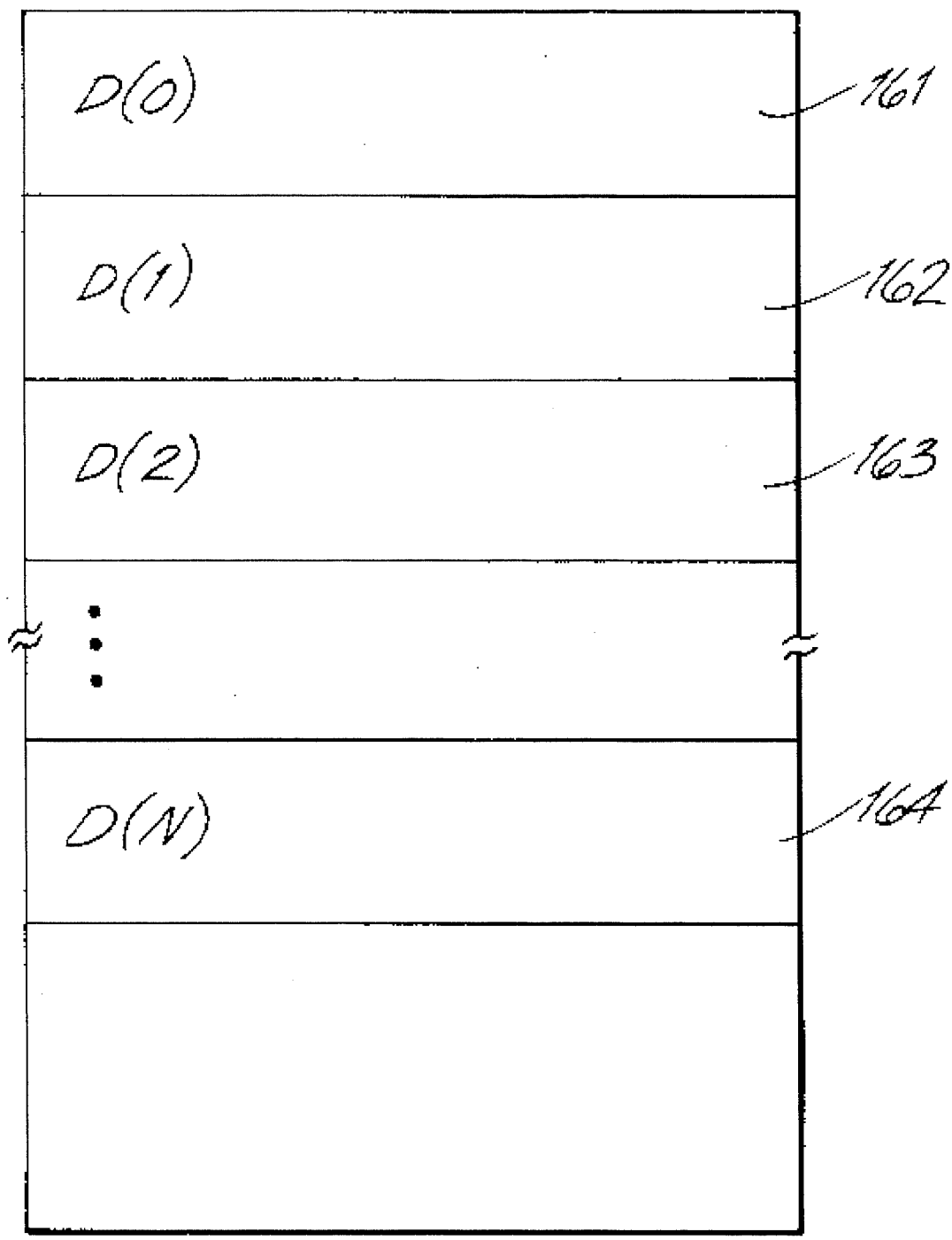
FIG. 6A is a drawing showing the format of a directory according to the present invention.
Figures 6C, 7:
FIG. 6C is a drawing of the format of a portion of the directory for one program or video clip on a vertical blanking interval (VBI) line 20 according to the present invention.
FIG. 7 is a drawing of the format of a TPA packet containing tape identification, program number, and absolute address information on VBI line according to the present invention.
Figure 9:
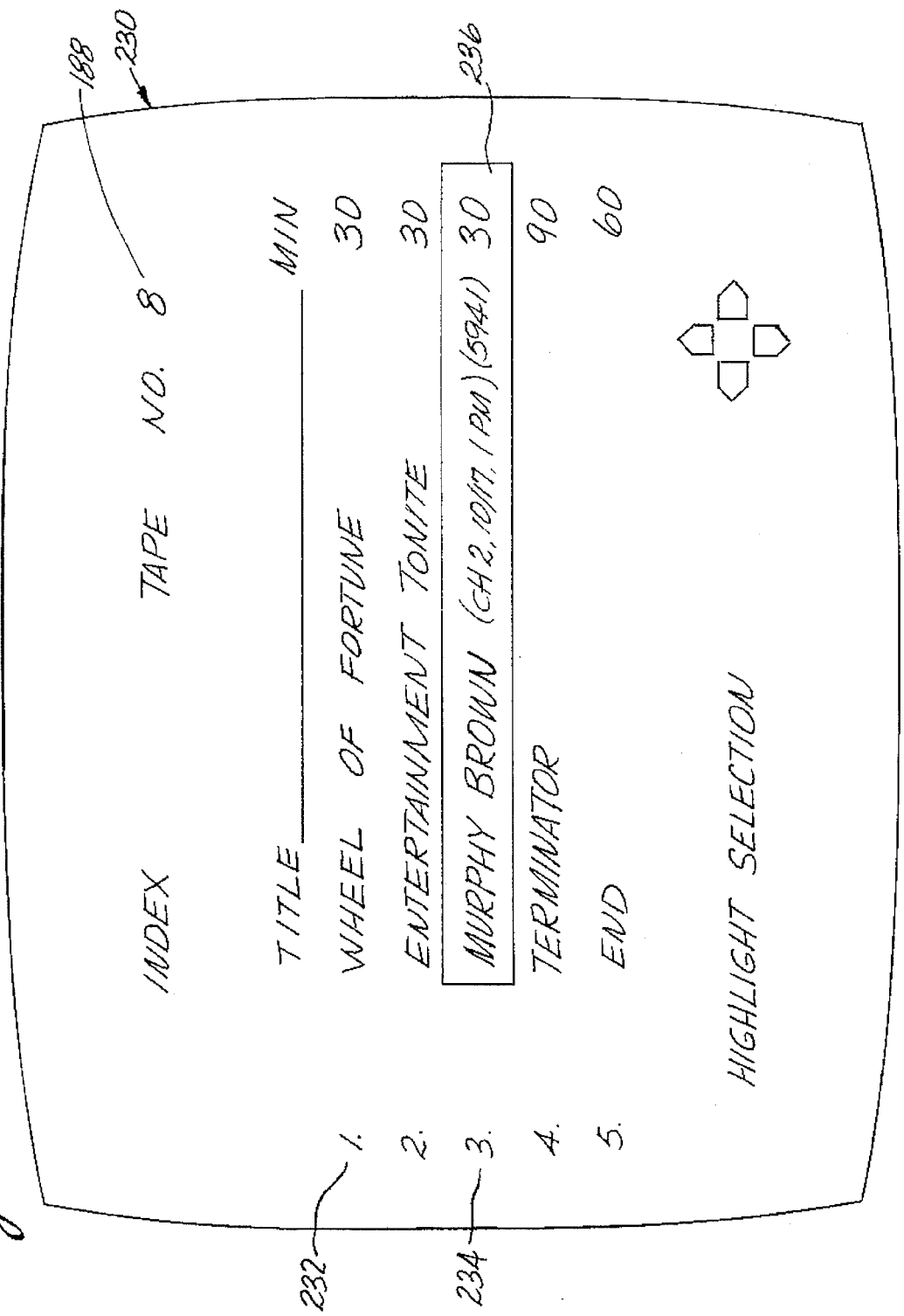
FIG. 9 is a drawing showing a display on a television of a text directory according to the present invention.

The TPA packets 152, shown in FIG. 5, contain a tape identification number 188, a program number 190 and an absolute address 192, as shown in FIG. 7, and are stored in vertical blanking interval line 20, designated as element 144 on FIG. 5. The tape identification is a number that identifies the video cassette tape being used. The program number relates to the number of the program that is recorded on the tape adjacent to the TPA packet. For example, the tape identification number, shown in FIG. 9, is number 8, and the program number for the program *MURPHY BROWN* is program number 3. The absolute address in the TPA packet is an indication of the time from the beginning of the tape to the location on the tape at which the particular TPA packet is written. Since the TPA is written in VBI lines across the tape, the absolute address varies across the tape and is quite accurate.

The directory written into VBI line 20, designated as element 144 in FIG. 5, has a format as shown in FIG. 6A. In the directory are entries D(0) to D(N), which are directory entries for each program. Each entry D(1) 161, and D(2) 162 to D(N) 164 is used to store information, as shown in FIG. 6C, concerning a program stored on the recording tape. For example, the program number 172, the start address 174, the end address 176, the record speed 178, and the compressed code 180 for recording at a later time a second program associated with the referred to as program number 172. Instead, a channel, date, time-of-day, and length 182 or a program identifier 184 can be used recording at a later time a second program associated with the program. The directory for a program can also contain the title for a program. The directory may be stored in one VBI line 20 or in multiple VBI lines, as required.

When the video cassette tape 20 is played in video cassette recorder 18, then the directory can be decoded by VBI decoder 24 and stored in random-access memory 32. The contents of the directory can be displayed on television 10 to allow the user to select a program on the tape for viewing. By decoding the tape identification number from the TPA packets, a library of tapes and contents of tape can be accumulated in random-access memory 32. The format 166 for the library can be as shown in FIG. 6B.

Figure 8:
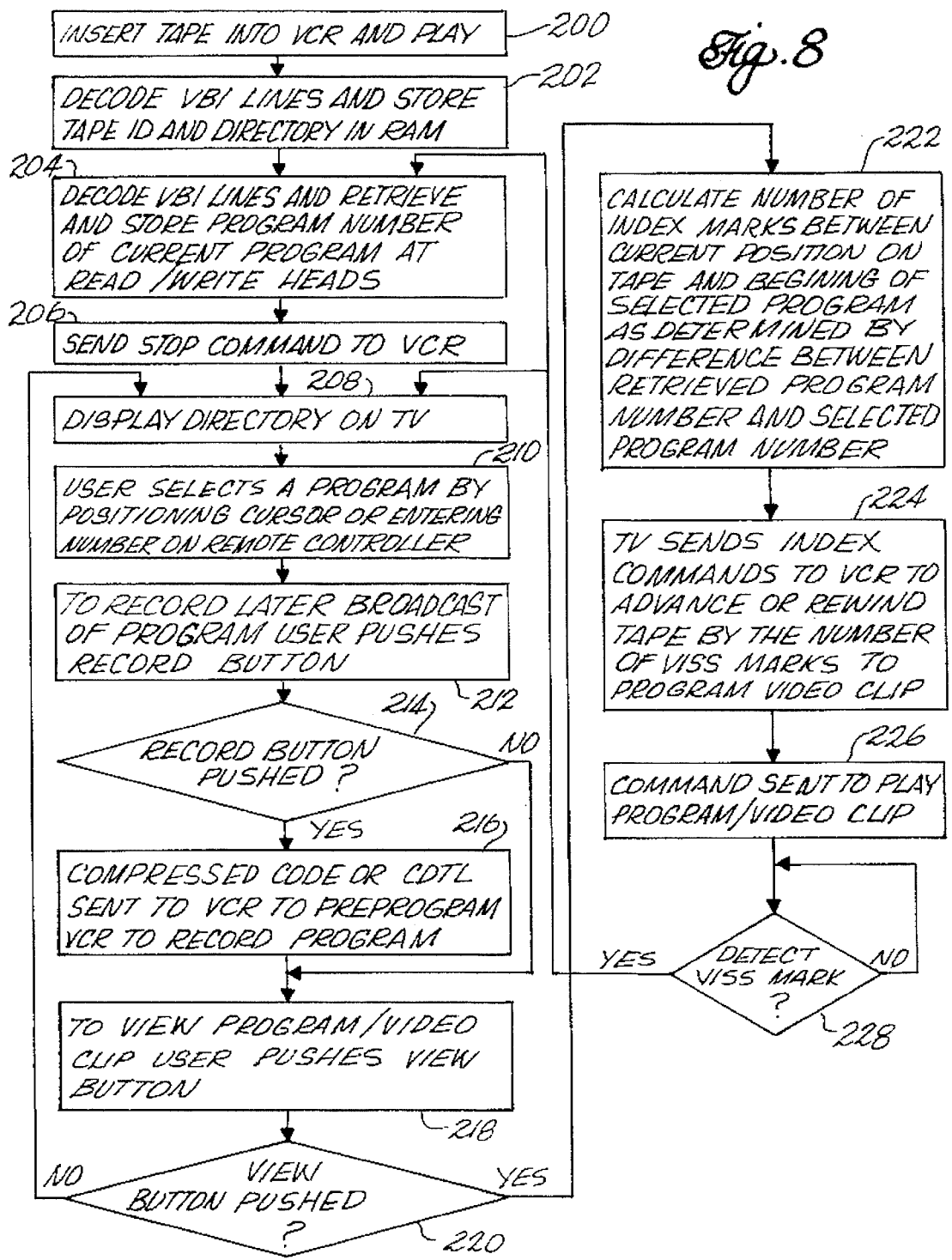
FIG. 8 is a flow graph of the steps for accessing programs and video clips on a magnetic tape according to the present invention.

The method for television 10 or controller 60 to control the video cassette recorder 18 to access programs on a video cassette tape 20 is described in the flow chart of FIG. 8. Step 200, a tape 21, having the format shown in FIG. 5 is inserted into VCR 18 and the VCR is put in a play mode. As the tape plays the VBI decoder 24 decodes the VBI lines and stores the tape identification and the directory on the tape into random-access memory 32 as shown in step 202. In step 204 the VBI lines are decoded and the program number of the current program at the read/write heads of VCR 18 is retrieved and stored in random-access memory 32. Then in step 206 a stop command is sent to VCR 18. In step 208 the microprocessor 26 via on-screen display controller 34 causes the stored directory to be displayed on the television monitor. In step 210 the user can select a program for viewing by either positioning a cursor on the program desired or entering a number on remote controller 12. For example, as shown in FIG. 9 the cursor can be put on to the program *MURPHY BROWN* or the user can enter the number 3 to view the program *MURPHY BROWN*. In step 212 to record a later broadcast of the program the user pushes the record button on remote controller 12. If the record button is pushed as determined in step 214, then in step 216, the compressed code for the channel, date, time-of-day and length for the selected program are sent to the VCR 18 to preprogram the VCR 18 to record the program when it is broadcast. For example, for *MURPHY BROWN* the compress code as shown on FIG. 9 is 5941. Also contained in this particular directory is the channel number, date and time-of-day which is channel 2, October 17, and 7:00 p.m. The length of the program is also shown for *MURPHY BROWN* to be 30 minutes.

To view a program or a video clip, the user pushes the view button in step 218. It is likely that a user will view a preview or video clip for a program first, and then decide whether he wants to record the program associated with the video clip at a later time. If in step 220 it is determined that the view button has been pushed, then in step 222, microprocessor 26 will calculate the number of index marks between the current position on the tape and the beginning of the selected program as determined by the difference between the retrieved program number and the selected program number. For example, if the retrieved program number is program 3, as shown in FIG. 5, then to access the beginning of program 1 the VCR 18 must rewind the video tape cassette by 3 VISS marks, so an index command of –3 is sent to the VCR. In step 224 the television 10 or the controller 60 sends the index command to VCR 18 to advance or rewind the tape by the number of VISS marks to the selected program or video clip. Then in step 226 a command is sent to play the selected program or video clip. While the program or video clip is playing the VBI decoder 24 continues to decode the vertical blanking interval lines and if a VISS mark is detected in step 228 then steps 204 and 206 are repeated and a directory again displayed on the television in order for the user to make another selection. At this time the user having viewed a video clip could decide to select the program associated with the video clip for later recording by the VCR 18.

FIG. 11A is a drawing showing another tape layout having an electronic guide with video clips according to the present invention. The tape has a control track 262, video and audio tracks 263 and vertical blanking interval 264 lines. As shown in FIG. 11A, the first length of the tape has VISS marks 266 and 267 in the control track 262. Between VISS marks 266 and 267 is a guide 270 in the video and audio tracks 263. As shown in FIG. 11A, the guide 270 consists of an index to video clips on the tape. For example, the first video clip is *ALADDIN* which will be shown on channel 2 on September 6th at 2:00 p.m. and has a length of two hours. The second video clip is *WAR AND PEACE*, which has a compressed code of 21596.

In the vertical blanking interval 266 lines is guide data associated with the guide. The guide data 272 includes for each video clip in the guide 270, the number of VISS marks from the guide to the video clip. Also, a compressed code associated with the video clip can be included within the guide data 272 or the channel, date, time of date and length (CDTL) or other program identifier can be included in the guide data for each video clip. The compressed code and the CDTL are used to preprogram a VCR to record at a later time a program associated with the video clip. After the end of the guide data is a still frame command 273.

If a cursor is used to select a video clip from the guide then a screen map 275 can be included in the guide data. The screen map 275 contains information that correlates each entry in the guide to a position on a displayed screen. As the user moves the position of the cursor the microprocessor 26, which processes the cursor commands from the remote controller 12, uses the screen map to know which entry in the guide is selected.

In a second length of the tape following the guide and the guide data, the first video clip 274 is written in the audio/video tracks 263 between VISS marks 264 and 268.

Following the video clip, the guide is repeated, as shown by guide 278 in FIG. 11A and guide data 280 is written on the vertical blanking interval lines. The guide data 280 is not the same as the guide data 272, because the number of VISS marks to a video clip from guide data 272 is different from the number of VISS marks to a video clip from guide data 280. As shown in FIG. 11A the second video clip 282 follows guide 278 and guide data 280. The pattern of repeating the guide and guide data after each video clip is repeated across the tape.

As the tape is played on video cassette recorder 18 the guide is displayed on television 10 and the guide data is sent via VBI decoder 24 to random-access memory 32. At the end of the guide data is a still frame command. When this still frame command is decoded by the VBI decoder 24, the microprocessor 26 sends a still frame command via infrared emitter 40 and infrared detector 32 to video cassette recorder 18. The guide is then displayed as a frozen frame on television 10.

Figure 17:
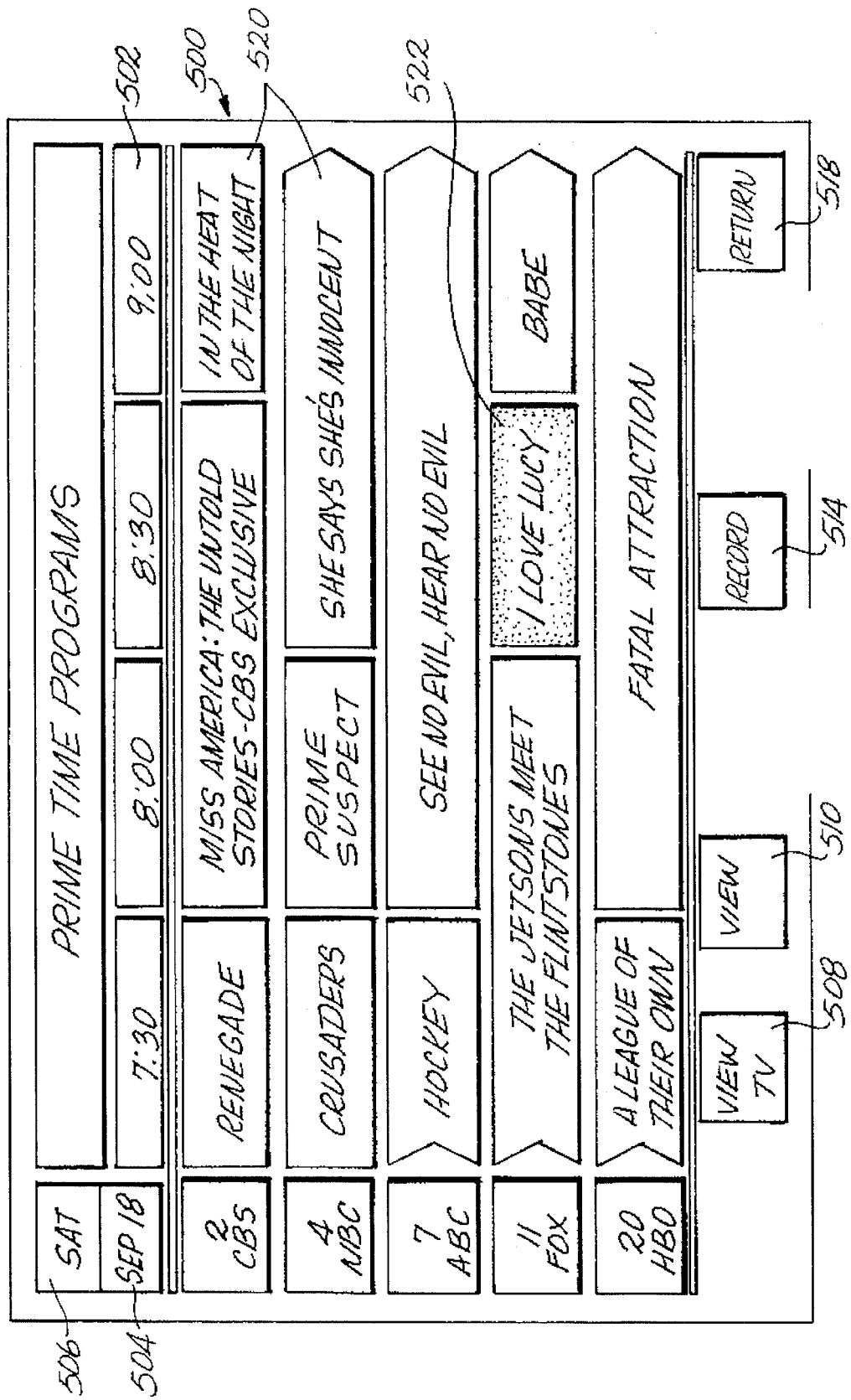
FIG. 17 is a drawing showing a display on a television of a video directory according to the present invention.

The guide can appear as text, similar to the program guide shown in FIG. 9, or can be a video frame as shown in FIG. 17. An advantage of the video frame is that the guide can have a more interesting appearance, use any font desired, and present a graphical interface to the user, such as those now common in personal computers. A video display is very useful for displaying Japanese or Chinese symbols.

To access a video clip the user pushes one of the number keys 44 and then pushes view key 46 on remote controller 12. It is also possible to use the cursor controls on remote controller 12 to highlight the desired program as shown by highlighted program 236 in FIG. 9 or highlighted program 522 in FIG. 17. The television 10 then sends index commands to video cassette recorder 18 via infrared emitter 40 and infrared detector 32 to advance or rewind the tape to the video clip selected by the user. This is accomplished by the microprocessor 26 in television 10 processing the guide data to determine the number of VISS marks forward or backward on the tape to the video clip selected by the user. For example, if guide 270 is displayed then to access video clip 282, the index command +3 is sent to advance the VCR to the beginning of video clip 282. If guide 278 is displayed then to access video clip 274, the index command –4 is sent to rewind the VCR to the beginning of video clip 274.

FIG. 11B shows another tape layout. In FIG. 11B a main guide 310 is shown that can used to access another guide, such as guide 314. This permits a hierarchy of guides to be displayed. For example, in guide 310 if the user selects category 1 for cars, then guide 314 is displayed listing cars for which video clips are available, such as BMW, Mercedes, and LEXUS.

The video clips can be used for showing previews of television programs or movies and also for classified advertisements and infomercials, such as for real estate. The video clip can also be arranged as a video magazine.

Figure 12:
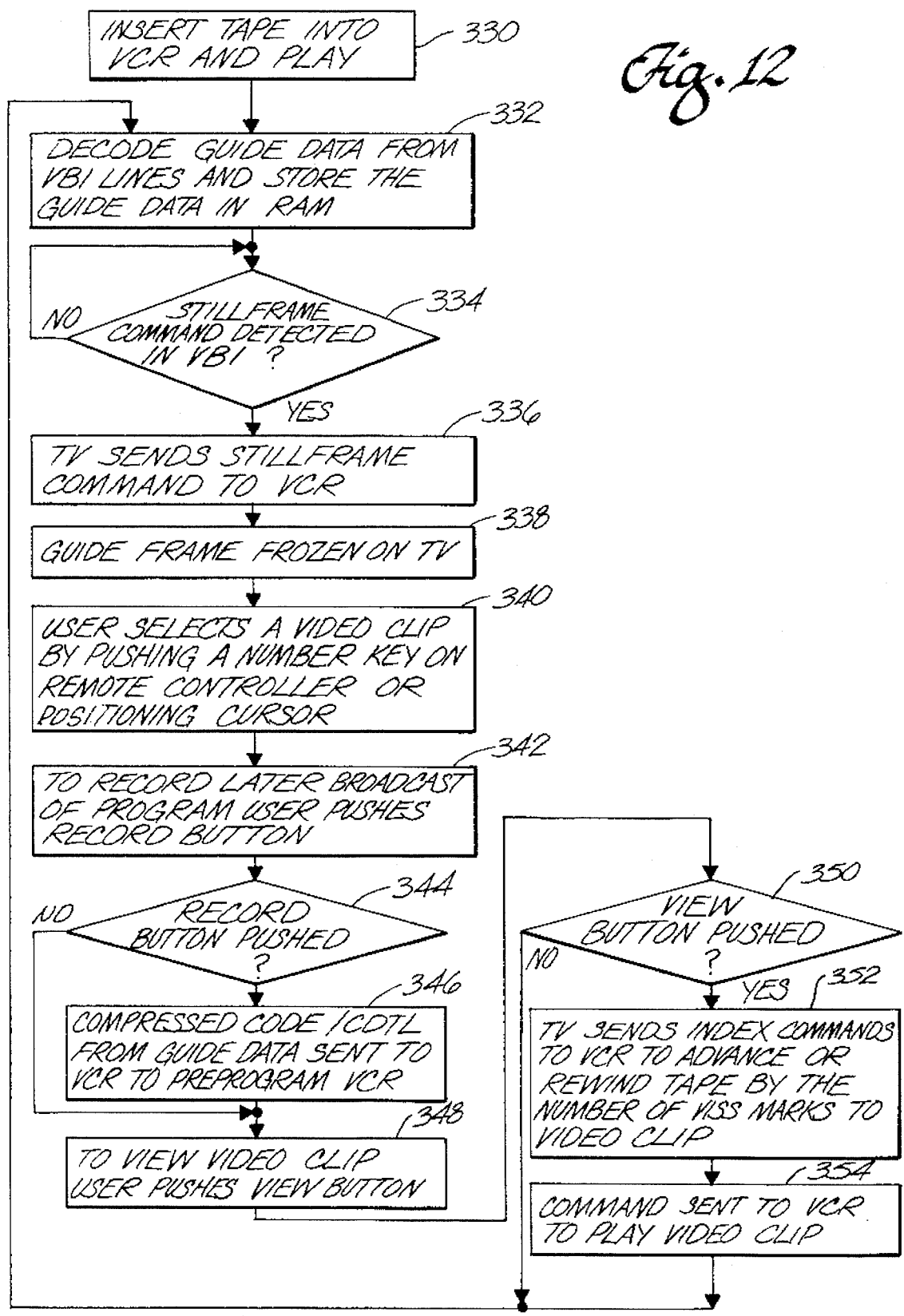
FIG. 12 is a flow graph of the steps for accessing video clips on a magnetic tape having a hierarchy of guides and embedded guide data according to the present invention.

The method for the television 10 or the controller 60 to control the video cassette recorder 18 to access programs on a video tape cassette 20 is described in the flow graph shown in FIG. 12. In step 330 a video tape cassette 20 with tape 21 in the format described in either FIG. 11*a* or FIG. 11B is inserted into the VCR 18 and the VCR is put into the play mode. In step 332 the guide data in VBI 264 lines of FIG. 11A or VBI 294 lines of FIG. 11B are decoded by VBI decoder 24 and stored into random-access memory 32. If a screen map 275 of FIG. 11A or screen map 315 of FIG. 11B is present to allow accessing a program using a cursor, then the screen map is also decoded from the VBI lines and stored into random-access memory 32. In step 334 it is determined whether still frame command 273 has been detected by the VBI decoder 24. If the still frame command has been detected then in step 336 the television 10 or the controller 60 sends a still frame command to VCR 18. This results in the guide 270 being frozen on the television monitor in step 338. In step 340 the user selects a video clip or program from the guide 270 by pushing a number key on remote controller 12 or positioning a cursor on the television monitor by using the remote controller cursor position keys. Then in step 342 the user can select to record a later broadcast of a program associated with the video clip or a program in the guide 270 by pushing the record button 48 on the remote controller 12. If it is determined in step 344 that the record button has been pushed, then in step 346 the compressed code or channel, date, time-of-day and length of the program to be recorded are retrieved from the guide data that has been stored in the random-access memory 32 and sent to the vide cassette recorder 18 to preprogram the VCR to record the program at a later time.

If the user wishes to view one of the video clips that are listed in the guide 270 then the user pushes the view button 46 in step 348. If it is determined in step 350 that the view button has been pushed, then in step 352 television 10 sends index commands to VCR 18 to advance or rewind the tape by the number of VISS marks to the selected video clip. For example, if *WAR AND PEACE* is selected from guide 270 then the corresponding guide data for clip number 2 would indicate that there are three VISS marks between the current position of the tape 21 relative to the read/write heads of the VCR 18 and the beginning of clip number two designated as element 282 in FIG. 11A. After the VCR 18 has advanced or rewind to the beginning of the video clip to be viewed, then in step 354 a command is sent to the VCR to play the video clip. In steps 332 and 334 are repeated and the user can select another video clip or program to view or record. Note that on FIG. 11A, after clip number two, designated as element 282 on FIG. 11A, that the guide 278 is repeated and that the guide data 284 is again present. There is a difference between guide data 284 and the guide data 272 because the number of VISS marks to a selected video clip is adjusted between the two guide data because of their position on the tape.

In the description so far it has been assumed that the user is provided with a video cassette tape that is prerecorded in a manner similar to the tape formats of FIGS. 5, 11A or 11B. One method of providing the user with a properly prerecorded video tape cassette is to deliver the tape along with another item that is regularly delivered to the user, such as a daily or weekly newspaper.

Another embodiment of the invention is to broadcast the programs and video clips rather than to provide them directly on a video cassette tape. The television 10 or controller 60 controls the recording of the broadcast on tape.

Figure 13A:
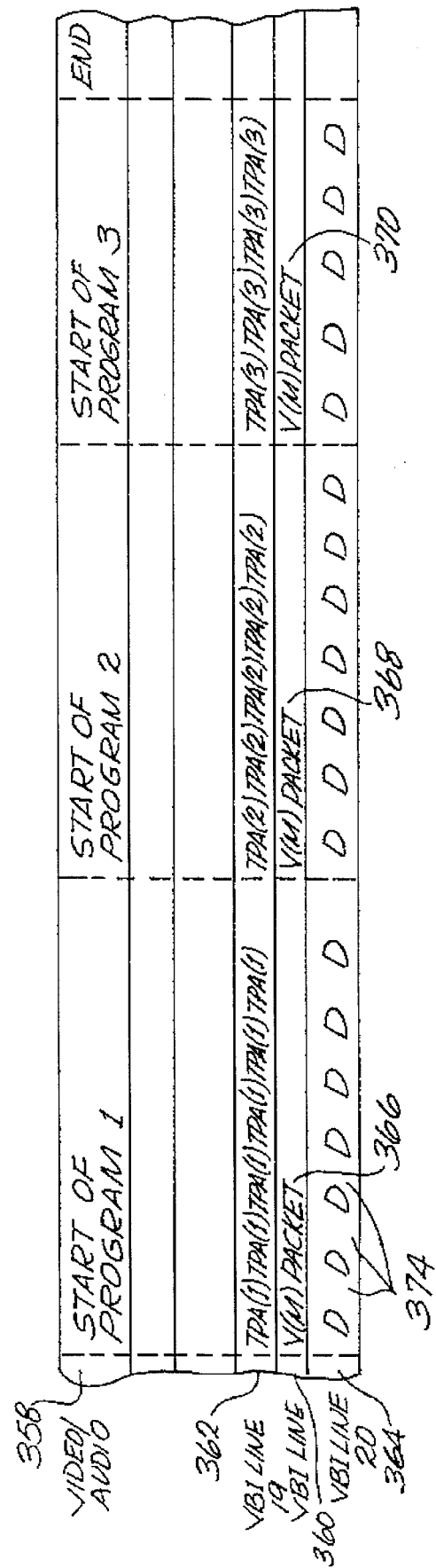
FIG. 13A is a drawing showing a broadcast format for a broadcast of programs and video clips according to the present invention.

FIG. 13A illustrates one layout of information in a broadcast. The broadcast layout has video and audio 358 for each program, TPA packets each containing a tape identification number and program number stored on a vertical blanking interval line 19, a directory broadcast in the vertical blanking interval line 20, and a V(M) packet broadcast in the vertical blanking interval lines at the beginning of each program.

The TPA packets 372, shown in FIG. 13A, contain a broadcast identification number and a program number, which are similar to the tape identification number 188 and program number 190, as shown in FIG. 7, and are broadcast in vertical blanking interval line 19, designated as element 362 on FIG. 13A. The broadcast identification is a number that identifies the broadcast.

The directory 374 written into VBI line 20, designated as element 364 in FIG. 13A, has a format as shown in FIG. 6A and the information for each program can include entries such as the program number, the program title, and a compressed code for recording at a later time a second program associated the program number. For example, the video clip may be a preview for a movie that is to be broadcast later. The compressed code is used to program a VCR to record the movie at a later time. The directory may be stored in one VBI line 20 or in multiple VBI lines, as required.

V(M) packets 366, 368 and 370 are broadcast in a VBI line, referred to as element 360 on FIG. 13A, at the beginning of each program. The VBI decoder 24 can decode a broadcasted V(M) packet to detect the beginning of each program during the broadcast.

If the VBI decoder 24 detects a V(M) packet during a broadcast, then the television 10 or controller 60 commands the VCR to write a VISS mark into the control track of the tape. For the broadcast shown in FIG. 13A the result after detecting V(M) packets and commanding the writing of VISS marks is shown in FIG. 13B which shows VISS marks 380, 384 and 386 written into the control track 380 of the tape. The V(M) packets are still present in the vertical blanking interval line, so it is important that during a play operation that the television 10 ignores the V(M) packets so that the VISS marks are not written again.

FIG. 14 is a flow chart of the steps for controlling the recording of a broadcast. In step 390 the VCR is in the process of recording a broadcast. The television 10 or controller 60 knows the mode of the VCR because they command through the infrared detector 32 the VCR to play, record and the like. In step 392 the VBI decoder decodes the VBI lines, and in step 396 if a V(M) packet is detected then, because the television 10 knows the VCR is in a record mode, the television 10 sends an index mark command to the VCR 18 and the VCR writes a VISS mark on the control track.

A user can be charged either a sales fee or a rental fee for a pre-recorded video cassette tape. In the case of a broadcast other provisions have to be made in order to charge the user for the information in the broadcast.

Figure 15A:
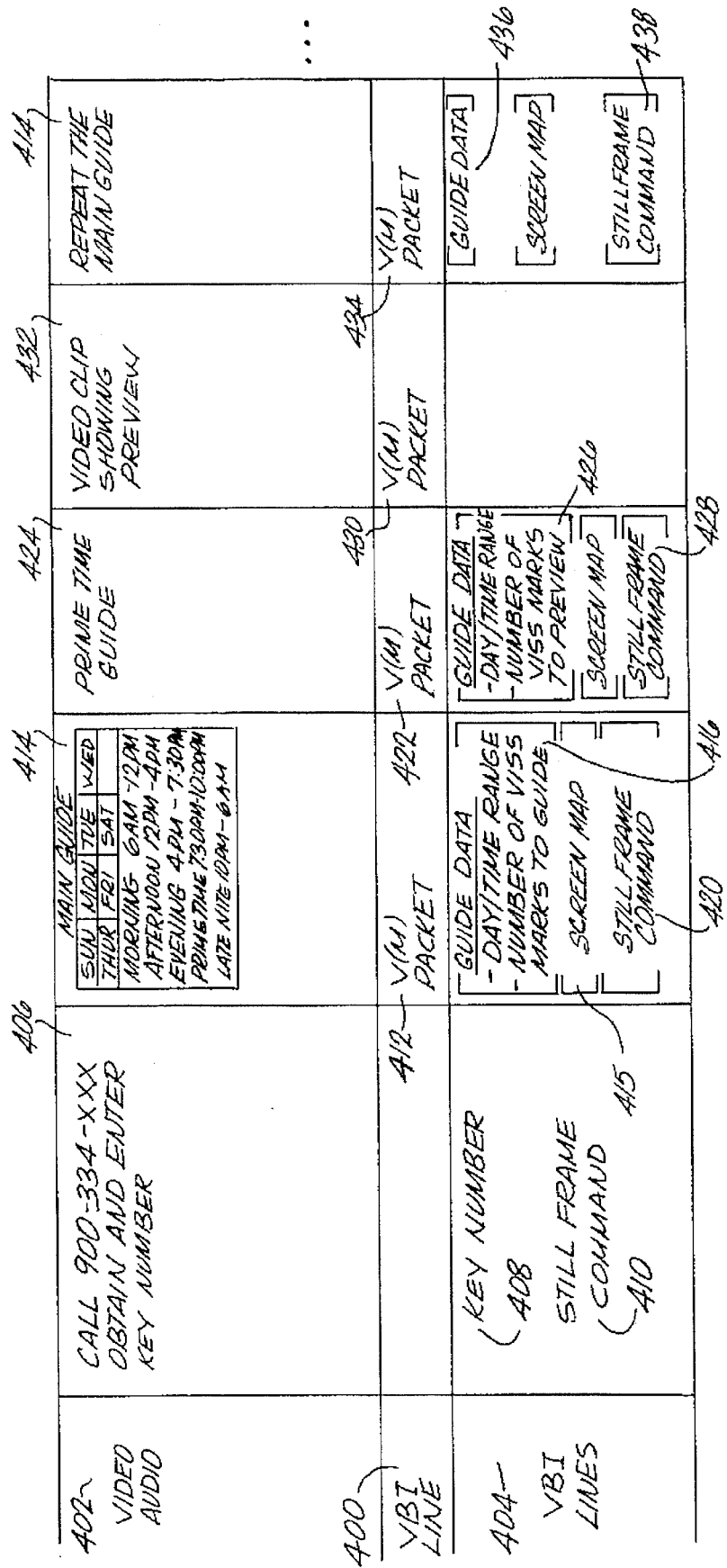
FIG. 15A is a drawing showing a broadcast format for a broadcast of programs, video clips, and/or a video directory according to the present invention.

FIG. 15A illustrates another layout of the information in a broadcast. The broadcast includes a video and audio portion 402. In the VBI line 400 V (M) packets are broadcast wherever a VISS mark is wanted on the tape. A message 406 is broadcast at the beginning of the broadcast and indicates to the user to call a 900 number to obtain a key number. A key number 408 and a still frame command 410 are broadcast in the vertical blanking interval lines, designated as 404 in FIG. 15A. Then a guide 414 and guide data 416 are broadcast. Guide 414 references other guides, in the same manner as FIG. 11B. For example, note that guide 414 is an index that includes "PRIME TIME" and that the guide data allows access to the guide 424, which is a detailed guide for that span of time. The guide data 416 is followed by a screen map 415 and a still frame command 420, which is recorded but otherwise ignored by television 10 or controller 60 during the broadcast.

The guide 424 could appear on the television screen as graphic display 500, shown in FIG. 17, which includes time-of-day 502, date 504, day of week 506, and programs 520. Buttons at the bottom that the user can select, using a cursor, include view television 508, view 510, record 514, and return 518 to the previous menu. To select *I LOVE LUCY* the user would position a cursor on program 522. The view 510 and record 514 graphical buttons operate in an analogous manner to the same named buttons on the remote controller 12.

Figure 16:
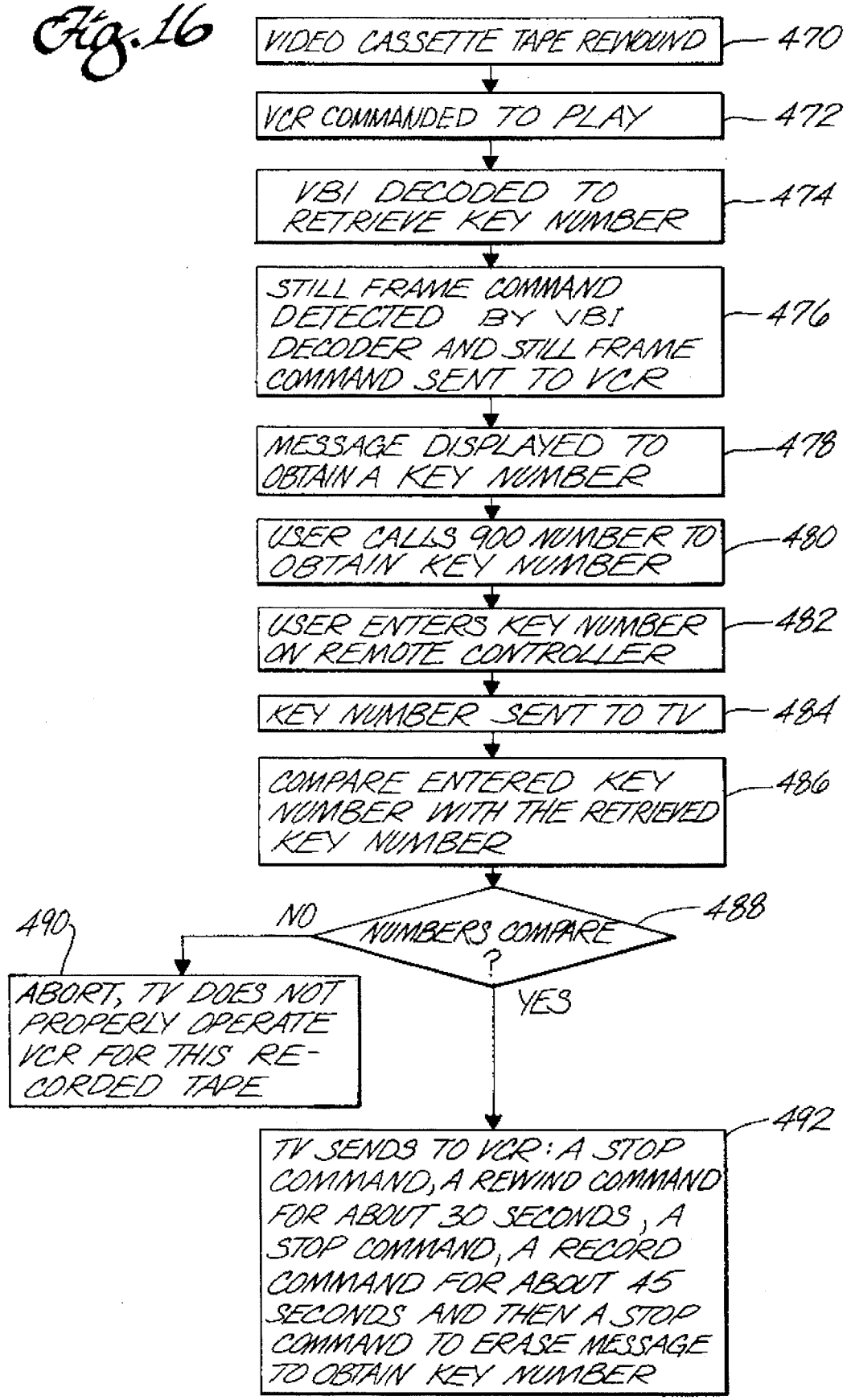
FIG. 16 is a flow graph of the steps for creating a tape during recording of a broadcast of programs, video clips, and/or a video directory according to the present invention.

If during a broadcast the VBI decoder 24 detects a V(M) packet, then the television 10 or controller 60 commands the VCR to write a VISS mark into the control track of the tape. For the broadcast shown in FIG. 15A the result after detecting V(M) packets and commanding the writing of VISS marks is shown in FIG. 15B. VISS marks 456, 458, 460, 462 and 464 are now written into the control track 450 of the tape. The V(M) packets are still present in the vertical blanking interval line, so it is important that during a play operation (which the television knowns because it commanded the mode of the VCR) that the V(M) packets be ignored so that the VISS marks are not written again. After a broadcast in the format shown in FIG. 15A, and the recording of that broadcast as described above, it is necessary for the user to obtain a key number by calling a 900 number in order to initialize the recording. The steps in this method are described in FIG. 16. After the recording of the broadcast the video cassette tape is rewind in step 470, then in step 472 the VCR 18 is commanded to play the tape. As the tape is played the VBI decoder 24 decodes the vertical blanking interval lines to retrieve key number 408 as shown in FIG. 15A. When still frame command 410 is detected by the VBI decoded 24, a still frame command is sent to VCR 18 in step 476. Then in step 478 the message 406 is displayed to the user for the user to obtain a key number. In step 480 the user calls the 900 number to obtain the key number, and then in step 482 the user enters the key number on the remote controller 12. In step 484 the key number is sent to the television 10 or the controller 60, and in step 486 the entered key number is compared with the key number retrieved from the vertical blanking interval lines. If the numbers do not compare in step 488, then in step 490 the television 10 or the controller 60 are put into a mode of operation which does not allow the television or controller to properly access programs on the recorded tape. If the numbers do compare in step 488, then in step 492 the television 10 or controller 60 erase the message to obtain the key number as well as the key number 408 and the still frame command 410 from the recorded tape. This is done by sending a stop command to the VCR followed by a rewind command for about 30 seconds, another stop command, record command for about 45 seconds and then a stop command which effectively erases the message 406 and the key number 408 as well as the still frame command 410. After the initialization the format of the tape is as shown in FIG. 15B. This format is essentially the same as the formats of FIGS. 11A and 11B, therefore the method described in FIG. 12 can be used by television 10 or controller 60 to control a VCR to access program on the video tape cassette.

Thus, there has been described a television for controlling a video cassette recorder to access programs on a video cassette tape.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method for controlling a video cassette recorder from a television to access programs on a video cassette tape, the method comprising the steps of:

broadcasting a television signal for a first length of time, the television signal having an initialization message to instruct a user to enter a key number, broadcasting a second key number in the vertical blanking interval of the television signal, and broadcasting a still frame indication in the vertical blanking interval of the television signal;

broadcasting the television signal for a second length of time, the television signal having a first index mark in the vertical blanking interval near the beginning of the second length and a second index mark in the vertical blanking interval near the end of the second length, a guide to broadcast programs between the first and second index marks, guide data associated with the guide broadcast between the first and second index marks, the guide data including for each program contained in the guide a number of index marks either forward or backward in the broadcast from between the first and second index marks to the program, and broadcasting a still frame command near the second index mark; and broadcasting the television signal for a third length of time, the television signal having a plurality of programs, each program having a third index mark broadcast in the vertical blanking interval near the beginning of the program and a fourth index mark broadcast in the vertical blanking interval near the end of the program.

2. The method of claim 1 further comprising the steps of:

recording the broadcast on the video cassette tape with the video cassette recorder as the broadcast is received;

ignoring any still frame commands in the broadcast; and detecting with a vertical blanking interval decoder in the television any index marks in the broadcast and for each index mark detected in the broadcast sending a index mark command from the television to the video cassette recorder to write the index mark on the video cassette tape as the broadcast is recorded on the video cassette tape.

3. The method of claim 2 further comprising the steps of:

rewinding the video cassette tape after the broadcast is complete;

playing the video cassette tape;

retrieving the second key number with the vertical blanking interval decoder in the television;

detecting the still frame indication with the vertical blanking interval decoder in the television;

sending the still frame command to the video cassette recorder upon detecting the still frame indication; and displaying the initialization message to instruct the user to enter the key number.

4. The method of claim 3 further comprising the steps of the user obtaining the key number via telephone and entering the key number.

5. The method of claim 4 further comprising the steps of:

comparing the entered key with the second key number;

if the entered key and the second key number compare then erasing a first length of video cassette tape corresponding to the first length of the broadcast; and if the entered key and the second key number do not compare then aborting the playing of the video cassette tape.

6. A method for controlling a video cassette recorder from a television to access programs on a video cassette tape, the method comprising the steps of:

broadcasting a television signal having a plurality of first and second lengths of time, the first length of time having a first index mark in the vertical blanking interval at the beginning of the first length of time and a second index mark in the vertical blanking interval at the end of the first length of time, and the television signal having between the first and second index marks: a guide to broadcast programs, guide data associated with the guide, the guide data including for each program contained in the guide a number of index marks either forward or backward in the television signal from the guide data to the program, and a still frame command before the second index mark, the second length of time being after the first length of time, and the television signal for the second period of time having the second index mark or a third index mark in the vertical blanking interval at the beginning of the second length of time and a fourth index mark in the vertical blanking interval at the end of the first length of time, and the television signal in the second length of time comprising a program;

wherein the next of the plurality of first and second lengths of time follows the second length of time.

7. The method of claim 6 further comprising the steps of:

receiving the broadcasted television signal;

recording the broadcasted television signal on the video cassette tape with the video cassette recorder as the broadcasted television signal is received;

ignoring any still frame commands in the broadcast; and detecting with a vertical blanking interval decoder any index marks in the television signal broadcast and for each index mark detected in the broadcast sending a index mark command to the video cassette recorder to write an index indication on the video cassette tape as the broadcasted television signal is recorded on the video cassette tape.

8. The method of claim 7 further comprising the steps of:

playing the video cassette tape;

retrieving the guide of programs from a first length of tape containing the recorded first length of time of broadcasted television signal;

retrieving the guide data associated with the guide of programs from the first length of tape;

retrieving a still frame indication from the first length of tape;

commanding the video cassette recorder to freeze the frame in order to display the guide of programs;

displaying the guide of programs to allow a user to select the program from the guide to play;

determining from the retrieved guide data the number of recorded index indications to either advance or rewind the video cassette tape to position the video cassette tape in the video cassette recorder at the beginning of the selected program in to the recorded second length of tape corresponding to a second length of time of broadcasted television signal;

commanding the video cassette recorder to advance or rewind the determined number of index indications to position the video cassette tape in the video cassette recorder at the beginning of the selected program;

playing the program; and repeating the steps inclusive of the step of retrieving the guide of programs to the step of playing the program.

9. The method of claim 8 wherein the step of displaying the guide of programs to allow the user to select the program from the guide to play further comprises the step of the user commanding the video cassette recorder to record at a later time a second program associated with the selected program.

10. The method of claim 9 wherein the step of commanding the video cassette recorder to record at the later time the second program associated with the selected program comprises the steps of decoding and expanding a compressed code, representative of, and compressed in length from, the combination of a channel, a day, a time-of-day, and a length in time for the second program.

11. The method of claim 8 wherein the step of broadcasting the television signal having the first and second lengths of time further comprises the step of:

broadcasting a television signal for a third length of time before the plurality of first and second lengths of time, the television signal for the third length of time having an initialization message instructing the user to obtain a first key number, a second key number in the vertical blanking interval of the television signal, and the still frame command in the vertical blanking interval of the television signal.

12. The method of claim 11 wherein the step of playing the video cassette tape further comprises the steps of:

retrieving the second key number with the vertical blanking interval decoder;

detecting the still frame command with the vertical blanking interval decoder;

displaying the initialization message instructing the user to obtain the first key number;

comparing an entered first key number with the retrieved second key number;

erasing a third length of video cassette tape corresponding to the third length of the broadcast television signal, if the entered first key number and the second key number compare; and aborting the step of playing the video cassette tape, if the entered first key number and the second key number do not compare.

13. A television for controlling a video cassette recorder to access programs on a video cassette tape, the television comprising:

means for receiving a broadcasted television signal having a plurality of first and second lengths of time, the first length of time having a first index mark in the vertical blanking interval at the beginning of the first length of time and a second index mark in the vertical blanking interval at the end of the first length of time, and the television signal having between the first and second index marks: a guide to broadcast programs, guide data associated with the guide, the guide data including for each program contained in the guide a number of index marks either forward or backward in the television signal from the guide data to the program, and a still frame command before the second index mark, the second length of time being after the first length of time, and the television signal for the second period of time having the second index mark or a third index mark in the vertical blanking interval at the beginning of the second length of time and a fourth index mark in the vertical blanking interval at the end of the first length of time, and the television signal in the second length of time comprising a program;

wherein the next of the plurality of first and second lengths of time follows the second length of time.

14. The television of claim 13 further comprising:

means for controlling the video cassette recorder to record the broadcasted television signal on the video cassette tape as the broadcasted television signal is received;

means for ignoring any still frame commands in the broadcast; and means for detecting with a vertical blanking interval decoder any index marks in the television signal broadcast and for each index mark detected in the broadcast sending a index mark command to the video cassette recorder to write an index indication on the video cassette tape as the broadcasted television signal is recorded on the video cassette tape.

15. The television of claim 14 further comprising:

means for commanding the video cassette recorder to play the video cassette tape;

means for retrieving the guide of programs from a first length of tape containing the recorded first length of time of broadcasted television signal;

means for retrieving the guide data associated with the guide of programs from the first length of tape;

means for retrieving a still frame indication from the first length of tape;

means for commanding the video cassette recorder to freeze the frame in order to display the guide of programs;

means for displaying the guide of programs to allow a user to select the program from the guide to play;

means for determining from the retrieved guide data the number of recorded index indications to either advance or rewind the video cassette tape to position the video cassette tape in the video cassette recorder at the beginning of the selected program in a recorded second length of tape corresponding to the second length of time of broadcasted television signal;

means for commanding the video cassette recorder to advance or rewind the determined number of index indications to position the video cassette tape in the video cassette recorder at the beginning of the selected program; and means for commanding the video cassette recorder to play the program.

16. The television of claim 15 wherein the means for displaying the guide of programs to allow the user to select the program from the guide to play further comprises means for the user to command the video cassette recorder to record at a later time a second program associated with the selected program.

17. The television of claim 16 wherein the means for the user to command the video cassette recorder to record at the later time the second program associated with the selected program comprises means for decoding and expanding a compressed code, representative of, and compressed in length from, the combination of a channel, a day, a time-of-day, and a length in time for the second program.

18. The television of claim 15 wherein the means for receiving the broadcasted television signal having the plurality of first and second lengths of time further comprises:

means for receiving the broadcasted television signal having for a third length of time before the plurality of first and second lengths of time, the television signal for the third length of time having an initialization message instructing the user to obtain a first key number, a second key number in the vertical blanking interval of the television signal, and the still frame command in the vertical blanking interval of the television signal.

19. The television of claim 18 wherein the means for commanding the video cassette recorder to play the video cassette tape further comprises:

means for retrieving the second key number comprising the vertical blanking interval decoder;

means for detecting the still frame command comprising the vertical blanking interval decoder;

means for displaying the initialization message instructing the user to obtain the first key number;

means for comparing an entered first key number with the retrieved second key number;

means for commanding the video cassette recorder to erase a third length of video cassette tape corresponding to the third length of the broadcast television signal, if the entered first key number and the second key number compare; and means for commanding the video cassette recorder to abort the playing of the video cassette tape, if the entered first key number and the second key number do not compare.

* * * * *

UNITED STATES PATENT AND TRADEMARK OFFICE
CERTIFICATE OF CORRECTION

PATENT NO. : 5,543,929                                      Page 1 of 3
DATED      : August 6, 1996
INVENTOR(S): Roy J. Mankovitz; Yee K. Ng; Daniel S. Kwoh It is certified that error appears in the above-indentified patent and that said Letters Patent is hereby corrected as shown below:

On the title page, between [22] and [51] insert the following:
-- Related U.S. Application Data
   [63] Continuation-in-part of Ser. No. 001,125,
   Jan. 5, 1993--.

[56] References Cited, U.S. Patent Documents, change
   "5,237,412  8/1993  Nakojima . . .348/461"
   to -- 5,237,412  8/1993  Nakajima . . .348/461 --

ABSTRACT, delete the ABSTRACT in its entirety and insert therefor:
-- Apparatus and methods for controlling a video cassette recorder from a television to access programs on a video cassette tape. The method includes the steps of broadcasting a television signal having a plurality of first and second lengths of time, the first length of time having a first index mark at the beginning of the first length of time and a second index mark in the vertical blanking interval at the end of the first length of time, and the television signal having between the first and second index marks, a guide to broadcast programs, guide data associated with the guide, the guide data including for each program contained in the guide a number of index marks either forward or backward in the television signal from the guide data to the program, and a still frame command before the second index mark, the second length of time being after the first length of time and comprising a program, recording the broadcasted television

UNITED STATES PATENT AND TRADEMARK OFFICE
CERTIFICATE OF CORRECTION

PATENT NO. : 5,543,929
DATED : August 6, 1996
INVENTOR(S) : Roy J. Mankovitz; Yee K. Ng; Daniel S. Kwoh It is certified that error appears in the above-indentified patent and that said Letters Patent is hereby corrected as shown below:

>
> signal on a video cassette tape with a video cassette recorder as the broadcasted television signal is received, detecting any index marks in the television signal broadcast and for each index mark detected in the broadcast sending an index mark command to the video cassette recorder to write an index indication on the video cassette tape as the broadcasted television signal is recorded on the video cassette tape, playing the video cassette tape, and using the guide and guide data to access programs on the tape. --

Column 1, line 5, after the title and before "Background of the Invention" insert the following:
> -- Related Application
> This is a continuation-in-part of patent application Serial No. 001,125, filed May 27, 1993, abandoned. --

Column 1, line 22, after "technique is" insert -- that the viewer must watch the entire tape to ascertain which previews are present. --
Column 1, line 64, change "a index" to -- an index --.
Column 4, line 61, change "memory 32 of the television" to
-- memory 32, television --.
Column 4, line 64, after "When" delete "a".
Column 5, line 36, before "programming" delete "the".
Column 5, line 62, before "each" delete "the".
Column 6, line 20, before "program" delete "as".
Column 6, line 22, after "used" insert -- for --.
Column 6, line 63, change "shown on" to -- shown in --.

UNITED STATES PATENT AND TRADEMARK OFFICE
CERTIFICATE OF CORRECTION

PATENT NO. : 5,543,929
DATED : August 6, 1996
INVENTOR(S) : Roy J. Mankovitz; Yee K. Ng; Daniel S. Kwoh It is certified that error appears in the above-indentified patent and that said Letters Patent is hereby corrected as shown below:

Column 7, line 46, change "time of date" to -- time of day --.
Column 8, line 41, after "can" insert -- be --.
Column 9, line 14, change "vide" to -- video --.
Column 9, line 29, change "rewind" to -- rewinds --.
Column 9, line 31, replace "In steps" with -- Steps --.
Column 10, line 4, after "associated" insert -- with --.
Column 11, line 9, change "knowns" to -- knows --.
Column 11, line 17, change "rewind" to -- rewound --.
Column 11, line 22, change "decoded 24" to -- decoder 24 --.
Column 11, line 48, change "program" to -- programs --.
Column 12, line 33, after "sending" change "a" to -- an --.
Column 13, line 32, after "sending" change "a" to -- an --.
Column 13, line 55, after "program in" delete "to".
Column 15, line 9, after "sending" change "a" to -- an --.

Signed and Sealed this

Tenth Day of February, 1998

Attest:

BRUCE LEHMAN

*Attesting Officer*     *Commissioner of Patents and Trademarks*